(12) United States Patent
Kim et al.

(10) Patent No.: US 10,320,546 B2
(45) Date of Patent: Jun. 11, 2019

(54) METHOD FOR REPORTING CHANNEL STATE, AND DEVICE THEREFOR

(71) Applicant: LG ELECTRONICS INC., Seoul (KR)

(72) Inventors: Kijun Kim, Seoul (KR); Jonghyun Park, Seoul (KR); Bonghoe Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 210 days.

(21) Appl. No.: 15/315,334

(22) PCT Filed: Jul. 30, 2015

(86) PCT No.: PCT/KR2015/007995
§ 371 (c)(1),
(2) Date: Nov. 30, 2016

(87) PCT Pub. No.: WO2016/018100
PCT Pub. Date: Feb. 4, 2016

(65) Prior Publication Data
US 2017/0195100 A1 Jul. 6, 2017

Related U.S. Application Data

(60) Provisional application No. 62/148,718, filed on Apr. 16, 2015, provisional application No. 62/132,458, filed on Mar. 12, 2015, provisional application No. 62/031,876, filed on Aug. 1, 2014.

(51) Int. Cl.
*H04L 5/00* (2006.01)
*H04B 7/06* (2006.01)
*H04B 7/0456* (2017.01)

(52) U.S. Cl.
CPC ......... *H04L 5/0053* (2013.01); *H04B 7/0456* (2013.01); *H04B 7/06* (2013.01); *H04L 5/00* (2013.01)

(58) Field of Classification Search
CPC .... H04L 5/0053; H04L 5/0057; H04W 72/04; H04W 72/042; H04W 72/08; H04B 7/06;
(Continued)

(56) References Cited

U.S. PATENT DOCUMENTS

2011/0249637 A1 10/2011 Hammarwall et al.
2012/0058791 A1 3/2012 Bhattad et al.
(Continued)

FOREIGN PATENT DOCUMENTS

| KR | 10-2014-0057005 A | 5/2014 |
| WO | WO 2011/100672 A1 | 8/2011 |
| WO | WO 2012/112291 A1 | 8/2012 |

OTHER PUBLICATIONS

Huawei et al., "Correction on CSI-RS configuration," R1-111931, 3GPP TSG RAN WG1 Meeting #65, Barcelona, Spain, May 9-13, 2011, 2 pages.

*Primary Examiner* — Paul H Masur
(74) *Attorney, Agent, or Firm* — Birch, Stewart, Kolasch & Birch, LLP

(57) ABSTRACT

According to one embodiment of the present invention, a method for reporting a channel state of a downlink channel transmitted through two-dimensionally arranged $N_t$ number of antenna ports is carried out by a terminal, wherein the method comprises the steps of: configuring each of the $N_t$ number of antenna ports to be mapped to all antenna elements belonging to a specific antenna element group, and each antenna port of an antenna port group corresponding to a reference signal (RS), which is transmitted in the same OFDM symbol, to be mapped to different antenna element groups from each other, and receiving a channel state information (CSI)-RS configuration for reporting a channel state for the antenna port group; and calculating channel state information on a downlink channel through a CSI-RS received using the received CSI-RS configuration, and
(Continued)

reporting, to a serving cell, the calculated channel state information, wherein the reported channel state information can contain a precoding matrix for selecting an antenna port group and a precoding matrix to be applied to the selected antenna port group.

14 Claims, 15 Drawing Sheets

(58) Field of Classification Search
CPC .. H04B 7/0613; H04B 7/0615; H04B 7/0619; H04B 7/0621; H04B 7/0626
See application file for complete search history.

(56) References Cited

U.S. PATENT DOCUMENTS

| | | | |
|---|---|---|---|
| 2013/0163544 A1 | 6/2013 | Lee et al. | |
| 2013/0258964 A1* | 10/2013 | Nam | H04W 72/046 370/329 |
| 2013/0329664 A1* | 12/2013 | Kim | H04W 24/10 370/329 |
| 2014/0079100 A1 | 3/2014 | Kim et al. | |
| 2014/0079146 A1* | 3/2014 | Kim | H04B 7/0417 375/260 |
| 2014/0079149 A1* | 3/2014 | Lee | H04B 7/0417 375/267 |
| 2014/0098689 A1 | 4/2014 | Lee et al. | |
| 2014/0241274 A1* | 8/2014 | Lee | H04L 5/0048 370/329 |
| 2015/0003325 A1* | 1/2015 | Sajadieh | H04W 76/10 370/328 |
| 2015/0043673 A1* | 2/2015 | Lee | H04B 7/0469 375/267 |
| 2015/0288497 A1 | 10/2015 | Li et al. | |
| 2015/0288499 A1* | 10/2015 | Nam | H04L 1/0026 370/329 |
| 2015/0341100 A1* | 11/2015 | Kwak | H04B 7/0626 370/329 |
| 2017/0141832 A1* | 5/2017 | Ji | H04B 7/0626 |

* cited by examiner

Antenna element        Antenna port

METHOD FOR REPORTING CHANNEL STATE, AND DEVICE THEREFOR

CROSS REFERENCE TO RELATED APPLICATIONS

This application is the National Phase of PCT/KR2015/007995 filed on Jul. 30, 2015, which claims priority under 35 U.S.C. § 119(e) to U.S. Provisional Application No. 62/031,876 filed on Aug. 01, 2014, U.S. Provisional Application No. 62/132,458 filed on Mar. 12, 2015, and U.S. Provisional Application No. 62/148,718 filed on Apr. 16, 2015, all of which are hereby expressly incorporated by reference into the present application.

TECHNICAL FIELD

The present invention relates to a wireless communication system, and more particularly to a method and apparatus for relaying a discovery signal for Device-to-Device (D2D) communication in a wireless communication system.

BACKGROUND ART

Various techniques including Machine-to-Machine (M2M) communication and various devices requiring a high data rate, e.g., smart phones and tablet Personal Computers (PCs), have emerged and gained popularity. As a consequence, the amount of data to be processed in a cellular network is rapidly increasing. To satisfy the rapidly increasing data processing requirement, Carrier Aggregation (CA), cognitive radio, etc. for efficiently using a larger number of frequency bands, and Multiple Input Multiple Output (MIMO), Coordinated Multipoint transmission and reception (CoMP), etc. for increasing the amount of data transmitted in limited frequencies have been developed. Furthermore, communication environments are evolving toward an increased density of nodes accessible by User Equipments (UEs). A node refers to a fixed point having one or more antennas and capable of transmitting or receiving radio signals to or from UEs. A communication system with densely populated nodes can provide high-performance communication services to UEs through cooperation between nodes.

This multi-node cooperative communication scheme in which a plurality of nodes communicate with a UE using the same time-frequency resources offers a higher throughput than in a conventional communication scheme in which each node operates as an independent Base Station (BS) and communicates with a UE without cooperation from other nodes.

A multi-node system performs cooperative communication by using a plurality of nodes, each of which is operating as a BS, an Access Point (AP), an antenna, an antenna group, a Radio Remote Header (RRH) or a Radio Remote Unit (RRU). Compared to a conventional centralized antenna system in which antennas are concentrated in a BS, the plurality of nodes are normally spaced apart from each other by a predetermined distance or more in the multi-node system. The plurality of nodes may be managed by one or more BSs or one or more BS Controllers (BSCs) that control operation of each node or schedule data to be transmitted or received through each node. Each node is connected to a BS or BSC that controls the node through a cable or a dedicated line.

The above-described multi-node system may be regarded as an MIMO system in the sense that distributed nodes can communicate with a single UE or multiple UEs by transmitting or receiving different streams at the same time. However, since signals are transmitted using nodes distributed to various locations, each antenna covers a reduced transmission area in the multi-node system, relative to antennas in the conventional centralized antenna system. As a result, each antenna may need a reduced Tx power in transmitting a signal in the multi-node system, compared to a conventional system that implements MIMO with a centralized antenna system. In addition, as the transmission distance between an antenna and a UE is reduced, path loss is decreased and high-rate data transmission is possible. Accordingly, the transmission capacity and power efficiency of a cellular system may be increased and communication may satisfactorily be performed with uniform quality irrespective of the locations of UEs within a cell. Furthermore, the multi-node system boasts of reduced signal loss during transmission because a BS(s) or BSC(s) connected to a plurality of nodes cooperate in data transmission and reception. Also, if nodes located apart from each other by a predetermined distance or more perform cooperative communication with a UE, correlation and interference between antennas are decreased. Consequently, the multi-node cooperative communication scheme achieves a high Signal-to-Interference plus Noise Ratio (SINR).

Owing to these advantages of the multi-node system, the multi-node system has emerged as a promising basis for cellular communication by substituting for the conventional centralized antenna system or operating in conjunction with the conventional centralized antenna system in order to reduce BS deployment cost and backhaul maintenance cost, extend service coverage, and increase channel capacity and SINR.

DISCLOSURE

Technical Problem

An object of the present invention is to provide a method for reporting a channel state, and more particularly to a channel state reporting method for use in the case in which two-dimensional (2D) array antenna elements are used for downlink transmission and a codebook denoted by a Kronecker product of a horizontal antenna precoding matrix and a vertical antenna precoding matrix is used as a codebook for the 2D-array antenna elements.

It is to be understood that technical objects to be achieved by the present invention are not limited to the aforementioned technical objects and other technical objects which are not mentioned herein will be apparent from the following description to one of ordinary skill in the art to which the present invention pertains.

Technical Solution

The object of the present invention can be achieved by providing a method for reporting, by a terminal, a channel state regarding a downlink channel transmitted through $N_t$ antenna ports arranged in a two dimension (2D) shape, the method including: wherein a respective one of the $N_t$ antenna ports are mapped to all antenna elements included in a specific antenna element group, the respective antenna ports of an antenna port group corresponding to a reference signal (RS) transmitted at the same OFDM symbol are mapped to different antenna element groups, and receiving a channel state information-reference signal (CSI-RS) configuration for reporting the channel state regarding the antenna port group; and calculating channel state information regarding a downlink channel through the received CSI-RS using the received CSI-RS configuration, and reporting the calculated CSI to a serving cell, wherein the reported channel state information includes a precoding matrix for selecting an antenna port group and a precoding matrix to be applied to the selected antenna port group.

Additionally or alternatively, the precoding matrix for selecting the antenna port group may be selected from an antenna port group selection codebook.

Additionally or alternatively, the precoding matrix to be applied to the selected antenna port group may be selected from a constant modulus codebook.

Additionally or alternatively, the method may further include: receiving information indicating whether transmission of the CSI-RS is activated or deactivated per antenna port group from the serving cell.

Additionally or alternatively, the precoding matrix for selecting the deactivated antenna port group may be excluded from the channel state information.

Additionally or alternatively, the method may further include: receiving information regarding precoding rank restriction for selecting the antenna port group or information regarding precoding rank restriction to be applied to the selected antenna port group from the serving cell.

In another aspect of the present invention, a terminal for reporting a channel state regarding a downlink channel transmitted through $N_t$ antenna ports arranged in a two dimension (2D) shape includes: a radio frequency (RF) unit; and a processor configured to process the RF unit. A respective one of the $N_t$ antenna ports are respectively mapped to all antenna elements included in a specific antenna element group, and the respective antenna ports of an antenna port group corresponding to a reference signal (RS) transmitted at the same OFDM symbol are mapped to different antenna element groups. The processor receives a channel state information-reference signal (CSI-RS) configuration for reporting the channel state regarding the antenna port group; and the processor calculates channel state information regarding a downlink channel through the received CSI-RS using the received CSI-RS configuration, and reports the calculated CSI to a serving cell. The reported channel state information includes a precoding matrix for selecting an antenna port group and a precoding matrix to be applied to the selected antenna port group.

Additionally or alternatively, the precoding matrix for selecting the antenna port group may be selected from an antenna port group selection codebook.

Additionally or alternatively, the precoding matrix to be applied to the selected antenna port group may be selected from a constant modulus codebook.

Additionally or alternatively, the processor receives information indicating whether transmission of the CSI-RS may be activated or deactivated per antenna port group from the serving cell.

Additionally or alternatively, the precoding matrix for selecting the deactivated antenna port group may be excluded from the channel state information (CSI).

Additionally or alternatively, the processor may receive information regarding precoding rank restriction for selecting the antenna port group or information regarding precoding rank restriction to be applied to the selected antenna port group from the serving cell.

It is to be understood that both the foregoing general description and the following detailed description of the present invention are exemplary and explanatory and are intended to provide further explanation of the invention as claimed.

Advantageous Effects

As is apparent from the above description, the embodiments of the present invention can efficiently report channel state information.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 6 is a conceptual diagram illustrating a transmittable pattern of CSI-RS having 8 antenna ports in a resource block (RB) composed of 12 subcarriers in the LTE-A system.

FIGS. 11 and 12 illustrate antenna port groups.

BEST MODE

Figure 1:
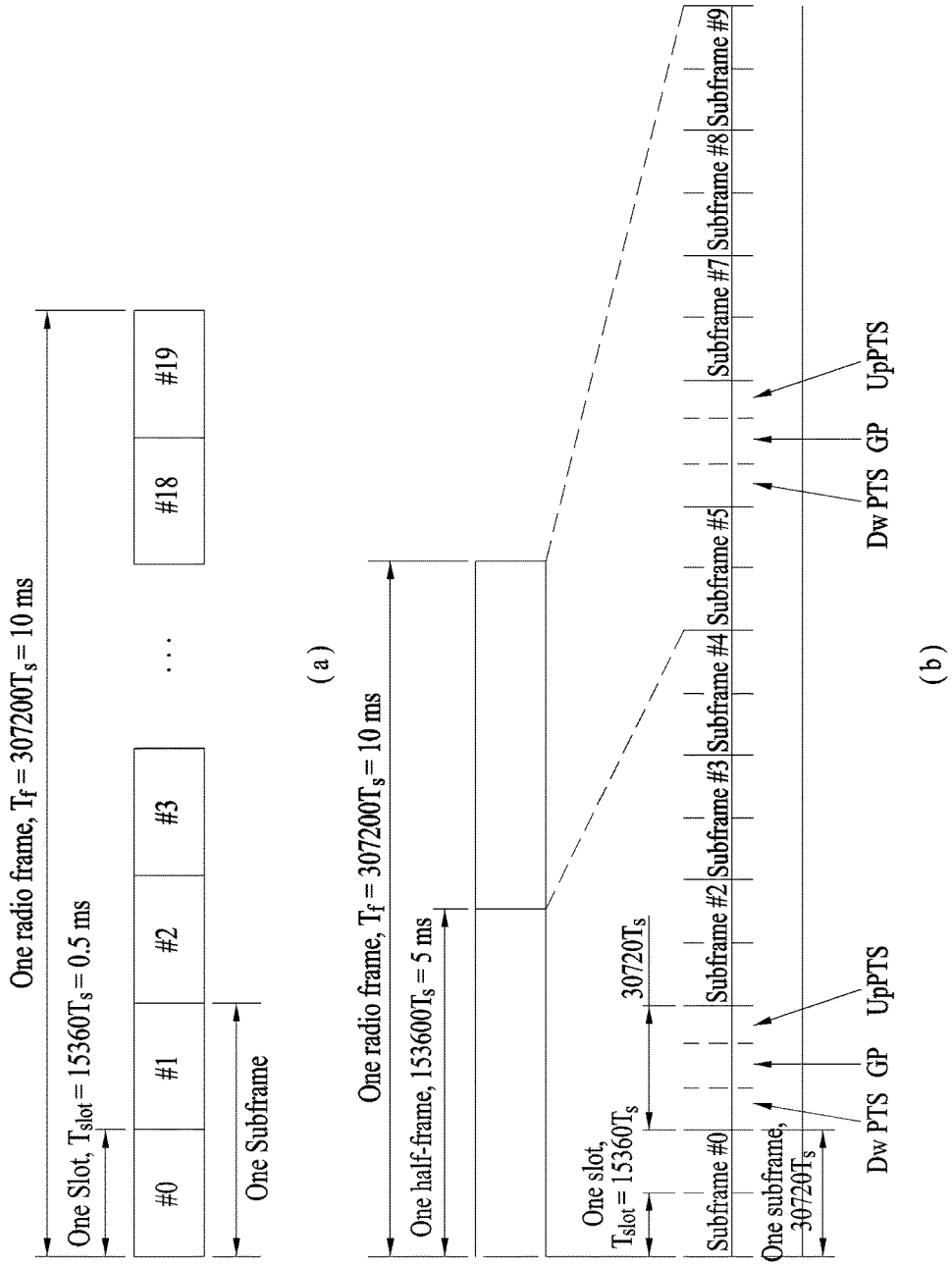
FIG. 1 exemplarily shows a radio frame structure for use in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlink a conventional centralized antenna system (CAS) (i.e., single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g., macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to multiple nodes may control the nodes such that signals are simultaneously transmitted to or received from a UE through some or all nodes. While there is a difference between multi-node systems according to the nature of each node and implementation form of each node, multi-node systems are discriminated from single node systems (e.g., a centralized antenna system (CAS), conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes may be applied to various types of multi-node systems. For example, a node refers to an antenna group spaced apart from another node by a predetermined distance or more, in general. However, embodiments of the present invention, which will be described below, may even be applied to a case in which a node refers to an arbitrary antenna group irrespective of node interval. In the case of an eNB including an X-pole (cross-polarized) antenna, for example, the embodiments of the preset invention are applicable on the assumption that the eNB controls a node composed of an H-pole antenna and a node composed of a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowledgement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

Figure 2:
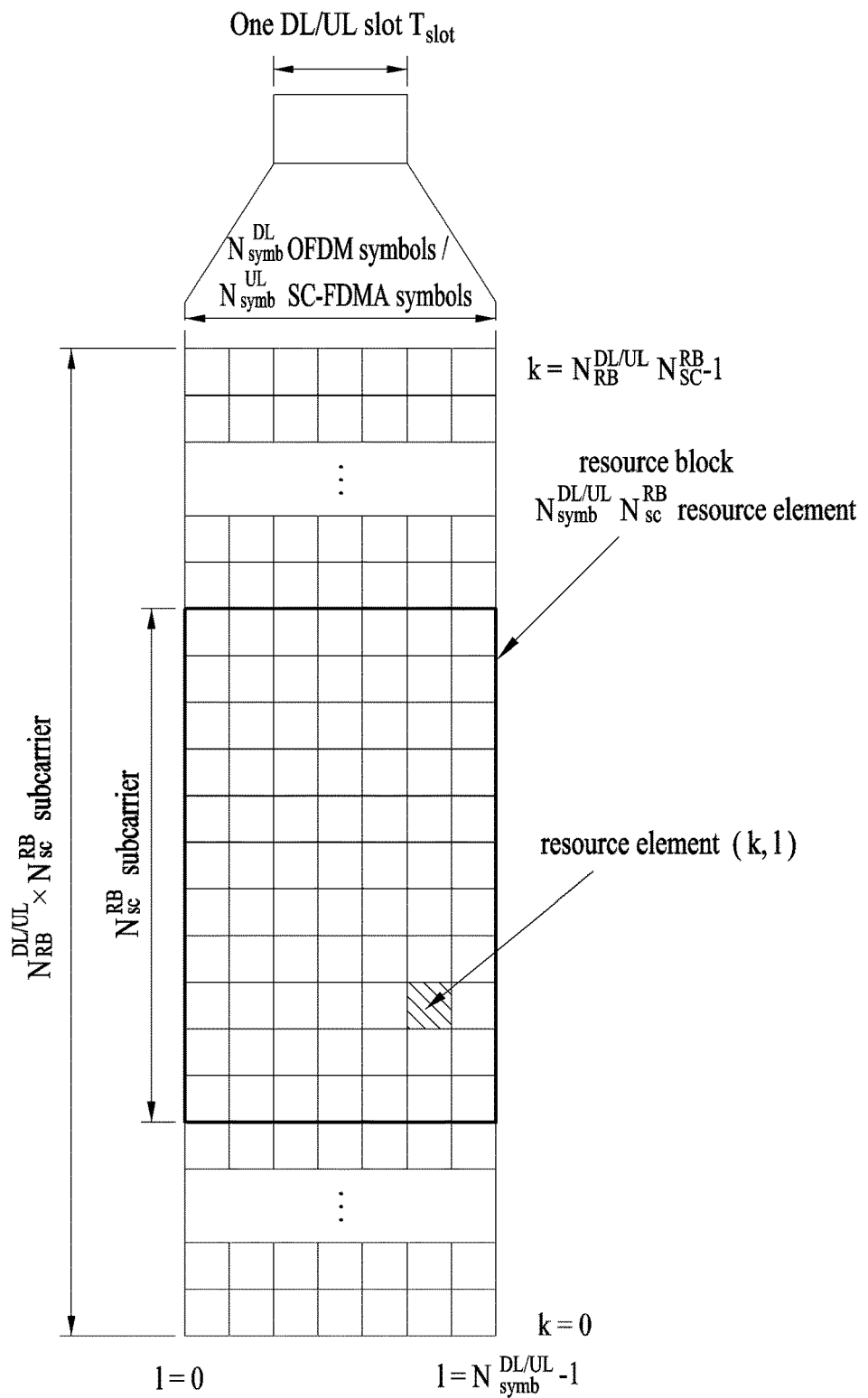
FIG. 2 exemplarily shows a downlink/uplink (DL/UL) slot structure for use in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g., 7) consecutive OFDM symbols in the time domain and $N_{sc}^{RB}$ (e.g., 12) consecutive subcarriers in the frequency domain. For reference, a resource composed by an OFDM symbol and a subcarrier is called a resource element (RE) or a tone. Accordingly, an RB is composed of $N_{symb}^{DL/UL} * N_{sc}^{RB}$ REs. Each RE in a resource grid can be uniquely defined by an index pair (k, 1) in a slot. Here, k is an index in the range of 0 to $N_{symb}^{DL/UL} * N_{sc}^{RB} - 1$ in the frequency domain and 1 is an index in the range of 0 to $N_{symb}^{DL/UL} - 1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, nPRB=nVRB is obtained. Numbers are given to the localized VRBs from 0 to $N_{VRB}^{DL} - 1$, and $N_{VRB}^{DL} = N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
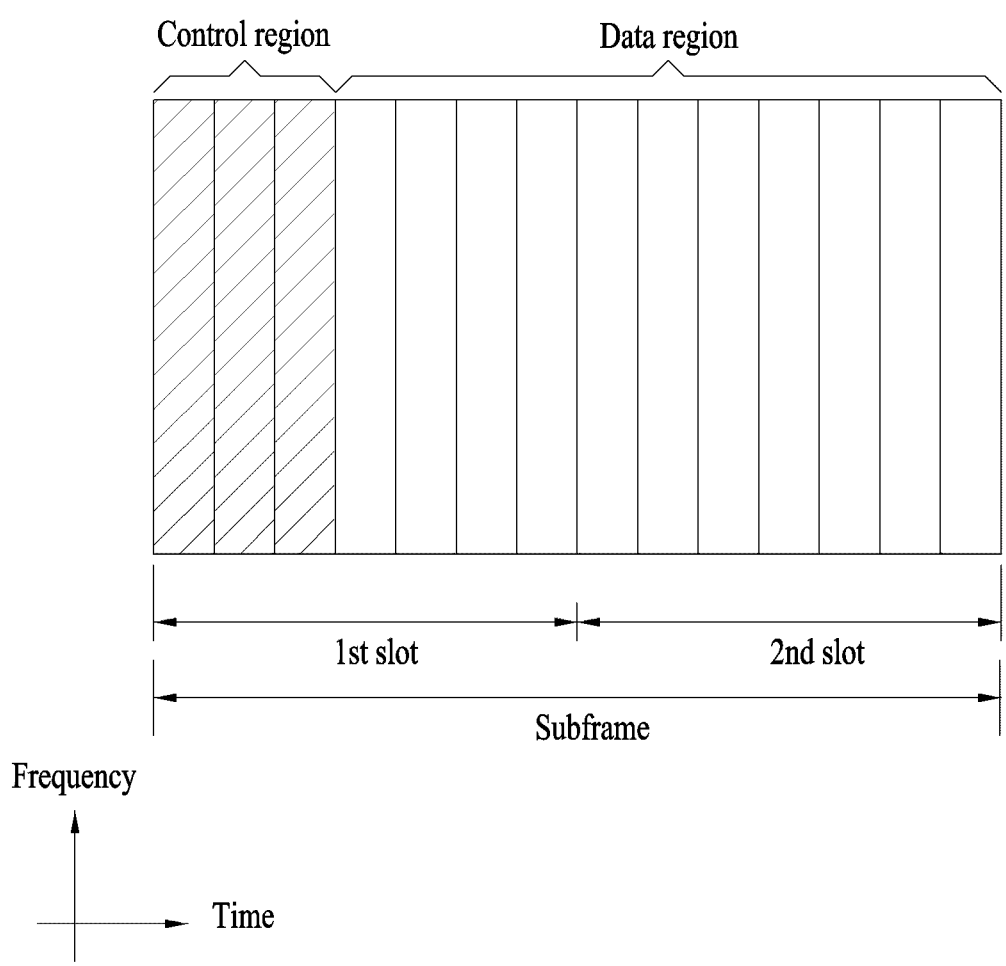
FIG. 3 exemplarily shows a downlink (DL) subframe structure for use in a 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| Type | Search Space Aggregation Level L | Size [in CCEs] | Number of PDCCH candidates $M^{(L)}$ |
|---|---|---|---|
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g., frequency position) of "B" and transmission format information (e.g., transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
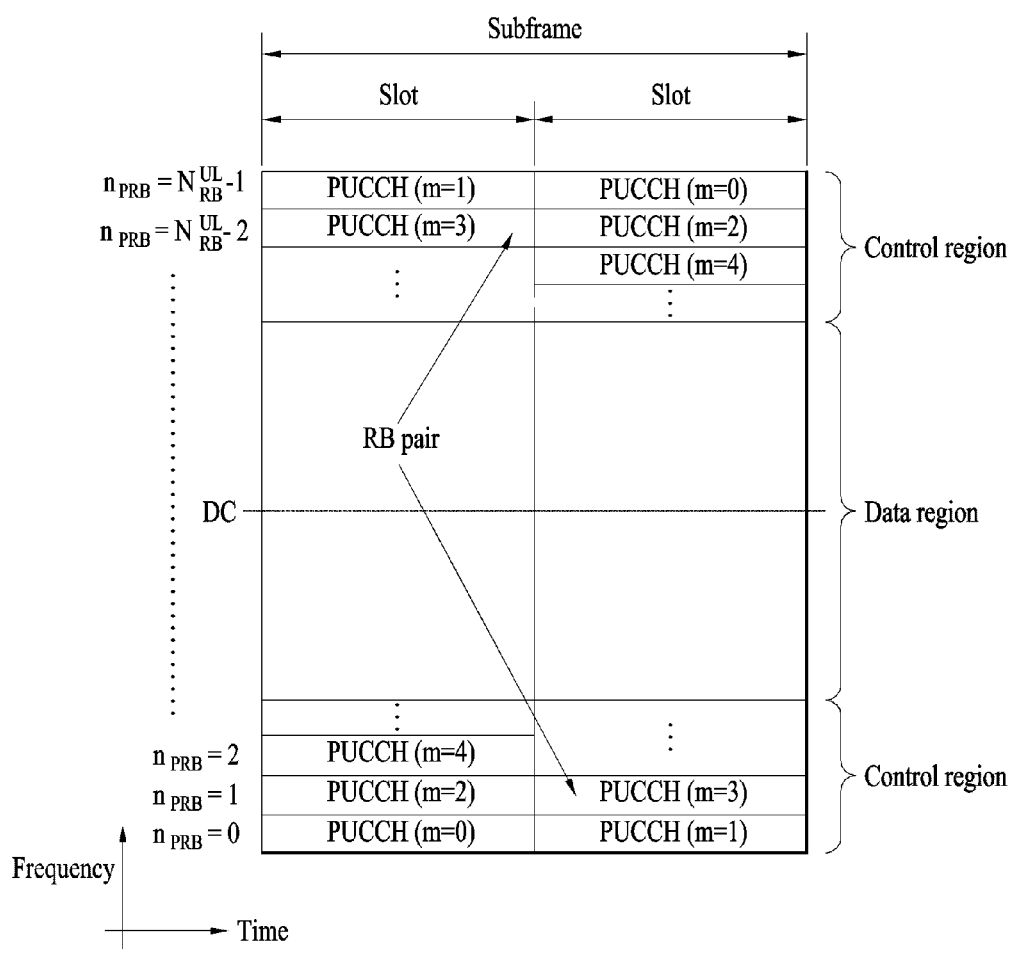
FIG. 4 exemplarily shows an uplink (UL) subframe for use in a 3GPP LTE/LTE-A system.
Figure 5:
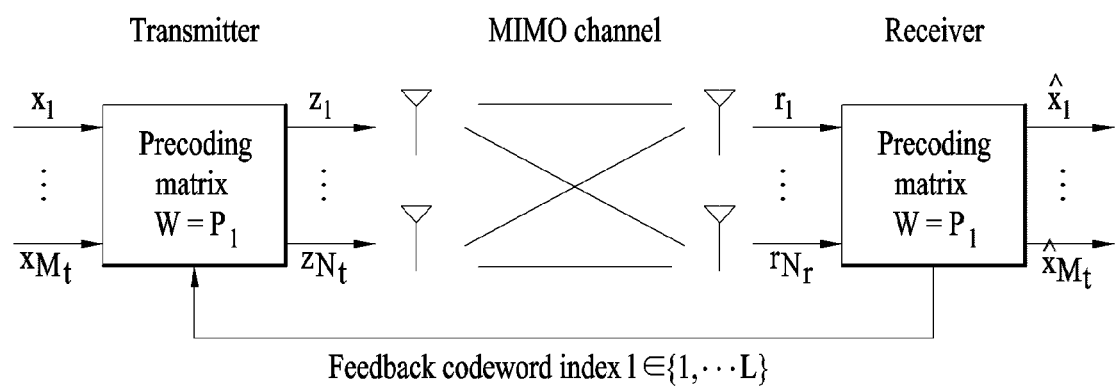
FIG. 5 is a conceptual diagram illustrating codebook based beamforming.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
| --- | --- | --- | --- | --- |
| 1 | N/A | N/A(exist or absent) | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Codebook-based Precoding

In order to support multi-antenna transmission, precoding for properly distributing information to be transmitted to the respective antennas according to the channel conditions may be employed. The codebook-based precoding technique refers to a technique of predetermining a precoding matrix set in a transmit terminal and a receive terminal, causing the receive terminal to measure channel information from the transmit terminal and feed back, to the transmit terminal, an indication (i.e., a precoding matrix index (PMI)) indicating the most appropriate precoding matrix and causing the transmit terminal to apply appropriate precoding to signal transmission based on the PMI. According to this technique, since an appropriate precoding matrix is selected in the predetermined precoding matrix set, feedback overhead may be reduced compared to the case of explicitly feeding back optimum precoding information through channel information even if optimum precoding is not always applied.

Figure 6:
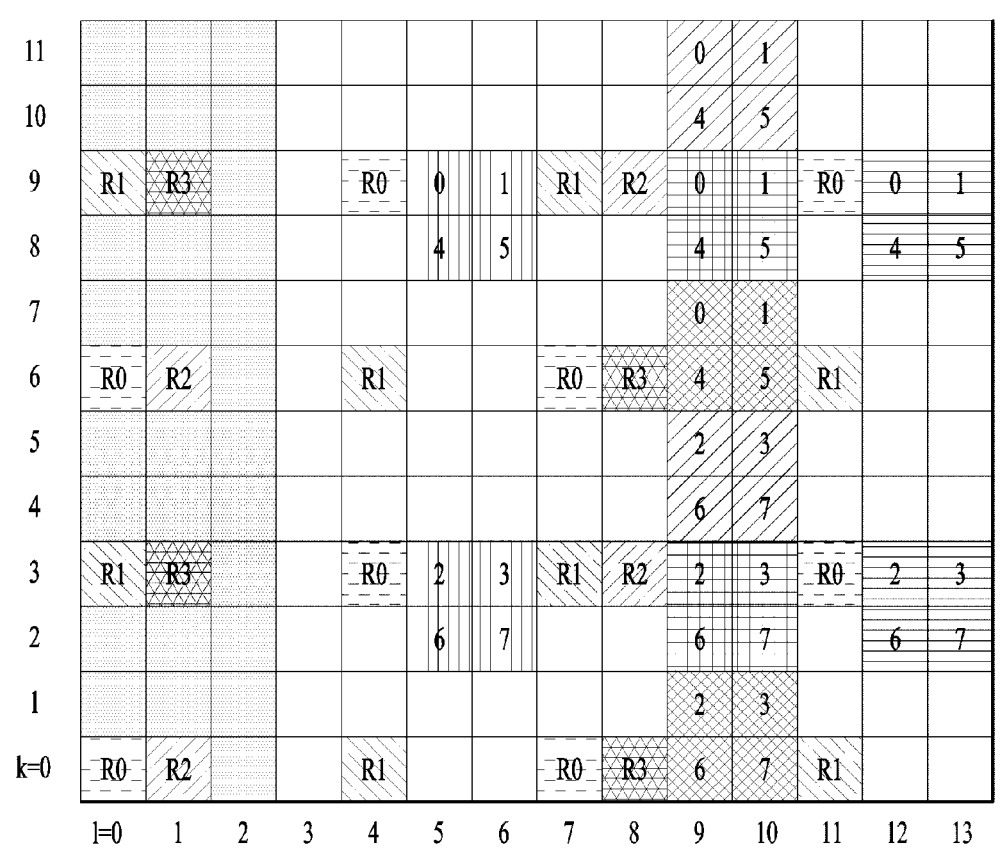

FIG. 6 illustrates the basic concept of codebook-based precoding.

According to the codebook-based precoding, the transmit terminal and receive terminal share codebook information including precoding matrices, the number of which is predetermined according to the transmission rank, the number of antennas, and the like. That is, the precoding-based codebook may be used if the feedback information is finite. The receive terminal may measure the channel state through a received signal, and feed back, to the transmit terminal, information about a finite number of preferred precoding matrices (namely, indexes of the corresponding precoding matrices). For example, the received terminal may measure the receive signal using the technique of maximum likelihood (ML) or minimum mean square error (MMSE), and select an optimum precoding matrix. While FIG. 6 illustrates that the receive terminal transmits, to the transmit terminal, precoding matrix information for respective codewords, embodiments of the present invention are not limited thereto.

Upon receiving feedback information from the receive terminal, the transmit terminal may select a specific precoding matrix in a codebook, based on the received information. Upon selecting the precoding matrix, the transmit terminal may perform precoding by multiplying layer signals, the number of which corresponds to a transmission rank by the selected precoding matrix, and transmit a transmit signal obtained through precoding via a plurality of antennas. The number of rows of the precoding matrix equals the number of antennas, and the number of columns of the precoding matrix equals the rank value. Since the rank value equals the number of layers, the number of columns of the precoding matrix equals the number of layers. For example, if the number of transmit antennas is 4, and the number of transmit layers is 2, the precoding matrix may be configured as a 4×2 matrix. Information transmitted through the respective layers using the precoding matrix may be mapped to the respective antennas.

Upon receiving the signal precoded and transmitted by the transmit terminal, the receive terminal may restore the received signal by performing reverse processing of the precoding performed by the transmit terminal. Typically, since a precoding matrix satisfies the criterion for a unitary matrix (U) such as $U*U^H=I$, the aforementioned reverse processing of the precoding may be implemented by multiplying the received signal by a Hermitian matrix $P^H$ for the precoding matrix P.

For example, Table 5 below shows a codebook used for downlink transmission using 2 transmit (Tx) antennas in 3GPP LTE Release-8/9, and Table 6 below shows a codebook used for downlink transmission using 4 Tx antennas in 3GPP LTE Release-8/9.

TABLE 5

| Codebook index | Number of rank | |
| --- | --- | --- |
| | 1 | 2 |
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | $\frac{1}{\sqrt{2}}\begin{bmatrix}1 & 1\\1 & -1\end{bmatrix}$ |
| 2 | $\frac{1}{\sqrt{2}}\begin{bmatrix}1\\j\end{bmatrix}$ | $\frac{1}{\sqrt{2}}\begin{bmatrix}1 & 0\\j & -j\end{bmatrix}$ |
| 3 | $\frac{1}{\sqrt{2}}\begin{bmatrix}1\\-j\end{bmatrix}$ | — |

TABLE 6

| Codebook index | $u_n$ | Number of layers υ | | | |
|---|---|---|---|---|---|
| | | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

In Table 6, $W_n^{\{s\}}$ is obtained with a set $\{s\}$ configured by an equation expressed as $W_n = I - 2u_n u_n^H / u_n^H u_n$. Herein, I denotes a 4×4 single matrix, and $u_n$ has a value given in Table 6.

As shown in Table 5, a codebook for 2 Tx antennas has 7 precoding vectors/matrices. Herein, since the single matrix is intended for an open-loop system, the number of factors/matrices for precoding of a closed-loop system becomes 6. A codebook for 4 Tx antennas as shown in Table 6 has 64 precoding vectors/matrices.

The codebooks described above have common features such as a constant modulus (CM) property, a nested property, constrained alphabet and the like. According to the CM property, no element in the precoding matrices in a codebook includes '0', and the respective elements have the same size. The nested property means that a precoding matrix of a lower rank is designed to be configured as a subset of a specific column of a precoding matrix of a higher rank. The constrained alphabet means that the respective elements in all precoding matrices in a codebook are constrained. For example, the elements of a precoding matrix may be constrained to elements (±1) used for binary phase shift keying (BPSK), elements (±1,±j) used for quadrature phase shift keying (QPSK), or elements $$\left(\pm 1, \pm j, \pm \frac{(1+j)}{\sqrt{2}}, \pm \frac{(-1+j)}{\sqrt{2}}\right)$$

used for 8-PSK. In the example codebook of Table 6, since the alphabet of the respective elements of all precoding matrices in the codebook is configured by $$\left\{\pm 1, \pm j, \pm \frac{(1+j)}{\sqrt{2}}, \pm \frac{(-1+j)}{\sqrt{2}}\right\},$$

the codebook may be considered as having the constrained alphabet property.

Reference Signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:

i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The downlink reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MBSFN) reference signal transmitted for coherent demodulation of a signal transmitted in MBSFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

As described above, two downlink RSs (i.e., a cell-specific RS (CRS) and a UE-specific RS) have been defined for a unicast service in the LTE system. UE-specific RS may be used only for data demodulation, and CRS may be used not only for data demodulation but also for RRM measurement (such as CSI acquisition or handover). CRS may be transmitted to the entire system band every subframe, and RS for a maximum of 4 antenna ports may be transmitted according to the number of transmit (Tx) antennas of a base station (BS). For example, assuming that the BS includes two Tx antennas, CRSs for antenna ports #0 and #1 may be transmitted. Assuming that the BS includes four Tx antennas, CRSs for antenna ports (#0~#3) may be respectively transmitted.

The LTE-A system may support a maximum of 8 Tx antennas through downlink of the BS. If the LTE-A system transmits a reference signal (RS) for a maximum of 8 Tx antennas to the entire band at each subframe according to the same scheme as in CRS of the legacy LTE, RS overhead may excessively increase. Therefore, RS for use in LTE-A may be classified into a CSI-RS for CSI measurement for selecting MCS, PMI, etc. and a DM-RS for data demodulation in such a manner that two RSs may be added. Although CSI-RS can be used for RRM measurement, the CSI-RS has been designed for CSI acquisition. CSI-RS is not used for data demodulation, such that the CSI-RS need not be transmitted at each subframe. Therefore, CSI-RS may be intermittently transmitted on a time axis so as to reduce CSI-RS overhead. For data demodulation, DM-RS may be dedicatedly transmitted to the UE scheduled in the corresponding time-frequency domain. That is, DM-RS of a specific UE may be transmitted only to the region (i.e., the time-frequency domain for receiving data) in which the corresponding UE is scheduled.

FIG. 6 is a conceptual diagram illustrating a transmittable pattern of CSI-RS having 8 antenna ports in a resource block (RB) composed of 12 subcarriers in the LTE-A system. RS for only one antenna port is spread throughout two OFDM symbols, and two RSs may share two REs and may be identified by the orthogonal codes. For example, RS denoted by numbers 0 and 1 may indicate two REs to which CSI-RS ports #0 and #1 are transmitted. For convenience of description and better understanding of the present invention, CSI-RS port #0 or #1 may be used. In order to discriminate between other kinds of RSs (e.g., CRS or UE-specific RS), CSI-RS port #0 or #1 may have an index #15 or #16. CSI-RS may include not only port #8 but also other ports (#1, #2, #4).

Figure 7:
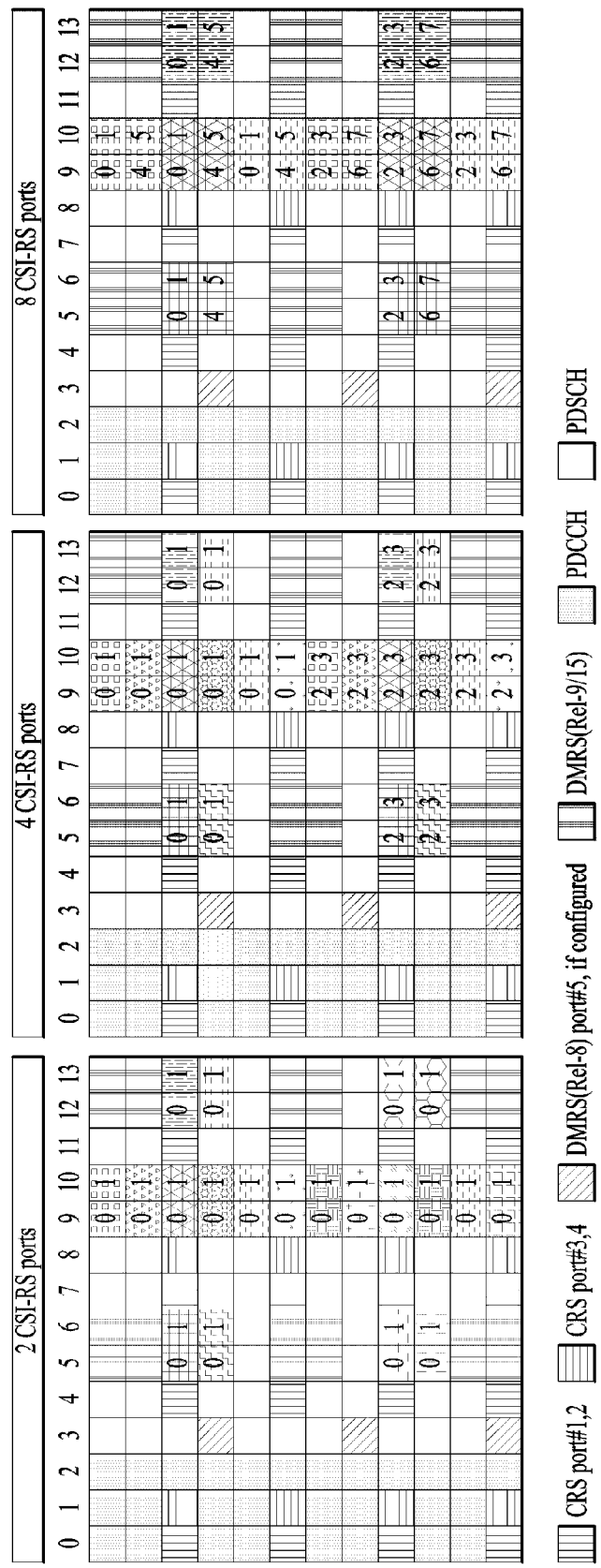
FIG. 7 is a conceptual diagram illustrating 2-port, 4-port, and 8-port CSI-RS transmission patterns.

In a method for transmitting a normal CP as shown in Table 7, the positions of Tx REs of the N-port CSI-RS may be denoted by a subcarrier index (k), an OFDM symbol index (l), and a slot index ($n_s$). As can be seen from Table 7, 8-port CSI-RS commonly applied to the frame structure type (FDD mode) and the Type 2 (TDD mode) of the LTE system may have only 5 Tx patterns in only one subframe. FIG. 7 shows 2-port, 4-port, and 8-port CSI-RS transmission patterns.

TABLE 7

| CSI-RS config- uration | Number of CSI-RSs configured | | | | | |
|---|---|---|---|---|---|---|
| | 1 or 2 | | 4 | | 8 | |
| | (k', l') | $n_{smod2}$ | (k', l') | nsmod2 | (k', l') | nsmod2 |
| FS-1 and FS-2 | | | | | | |
| 0 | (9, 5) | 0 | (9, 5) | 0 | (9, 5) | 0 |
| 1 | (11, 2) | 1 | (11, 2) | 1 | (11, 2) | 1 |
| 2 | (9, 2) | 1 | (9, 2) | 1 | (9, 2) | 1 |
| 3 | (7, 2) | 1 | (7, 2) | 1 | (7, 2) | 1 |
| 4 | (9, 5) | 1 | (9, 5) | 1 | (9, 5) | 1 |
| 5 | (8, 5) | 0 | (8, 5) | 0 | | |
| 6 | (10, 2) | 1 | (10, 2) | 1 | | |
| 7 | (8, 2) | 1 | (8, 2) | 1 | | |
| 8 | (6, 2) | 1 | (6, 2) | 1 | | |
| 9 | (8, 5) | 1 | (8, 5) | 1 | | |
| 10 | (3, 5) | 0 | | | | |
| 11 | (2, 5) | 0 | | | | |
| 12 | (5, 2) | 1 | | | | |
| 13 | (4, 2) | 1 | | | | |
| 14 | (3, 2) | 1 | | | | |
| 15 | (2, 2) | 1 | | | | |
| 16 | (1, 2) | 1 | | | | |
| 17 | (0, 2) | 1 | | | | |
| 18 | (3, 5) | 1 | | | | |
| 19 | (2, 5) | 1 | | | | |

CSI-RS configuration for use in the current LTE standard is composed of antennaPortsCount, subframeConfig, resourceConfig, etc., such that the CSI-RS configuration may indicate how many antenna ports are used for CSI-RS transmission, may indicate the period and offset of the subframe to which CSI-RS will be transmitted, and may indicate which RE position (frequency and OFDM symbol index) within the corresponding subframe is used for CSI-RS transmission. In more detail, the BS may transmit the following information when transmitting specific CSI-RS configuration to the UE.

antennaPortsCount: This is a parameter (e.g., 1 CSI-RS port, 2 CSI-RS ports, 4 CSI-RS ports, or 8 CSI-RS ports) for indicating the number of antenna ports used for CSI-RS transmission.

resourceConfig: This is a parameter indicating the position of CSI-RS allocation resource.

subframeConfig: This is a parameter indicating a subframe period and an offset to be used for CSI_RS transmission.

p-C: This is a parameter for UE assumption for a reference PDSCH transmit (Tx) power for CSI feedback CSI-RS. Pc is the ratio of CSI-RS EPRE to PDSCH EPRE (energy per resource element) when a user equipment (UE) has [−8, 15]dB values as the 1 dB step during calculation of the CSI feedback.

zeroTxPowerResourceConfigList: This is a parameter for zero-power CSI-RS configuration.

zero TxPowerSubframeConfig: This is a parameter for the subframe period and offset to be used for transmission of a zero power CSI-RS.

Introduction of the active antenna system (AAS) is considered in the evolved wireless communication systems. The AAS refers to a system in which each antenna includes an active element such as an amplifier, differently from a conventional passive antenna system in which the amplifier capable of adjusting the phase and magnitude of a signal is separated from the antenna. The AAS is efficient in terms of energy and operation cost since the AAS uses active antennas and thus does not require an additional cable, connector, hardware and the like to connect the amplifier to antennas. In addition, since the AAS supports electronic beam control for each antenna, the AAS enables enhanced MIMO technology such as formation of an accurate beam pattern in consideration of a beam direction and a beam width or formation of a three-dimensional (3D) beam pattern.

Figure 8:
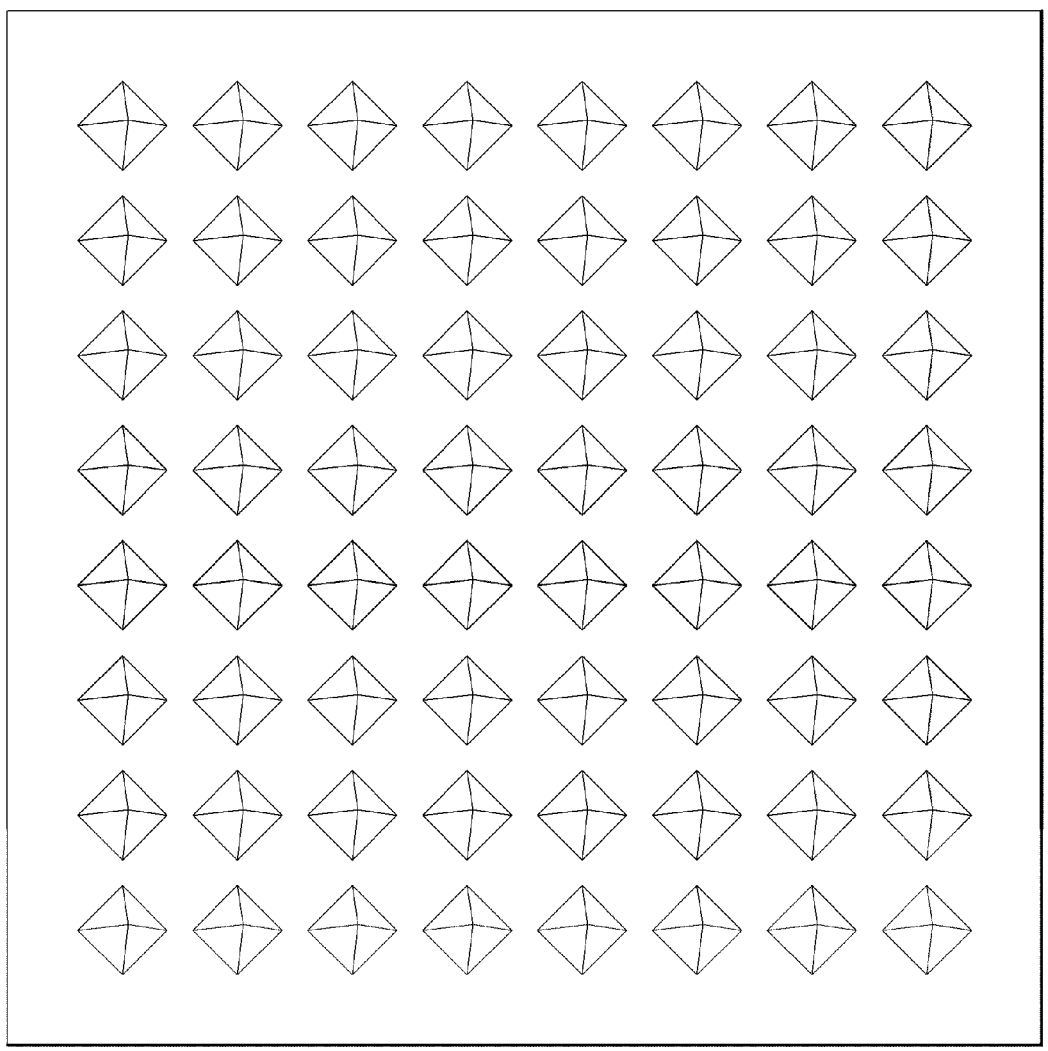
FIG. 8 is a conceptual diagram illustrating a two-dimensional (2D) antenna array.

With the introduction of an enhanced antenna system such as the AAS, a large-scale MIMO system having a plurality of input/output (I/O) antennas and a multi-dimensional antenna structure is considered. For example, when a two-dimensional (2D) antenna array instead of a conventional linear antenna array is formed, a three-dimensional (3D) beam pattern can be generated according to active antennas of the AAS. $N_t$ (i.e., $N_t=N_v \cdot N_h$) antennas may have a square shape as a general 2D antenna array as shown in FIG. 8. $N_h$ is the number of antenna columns, and $N_v$ is the number of antenna rows.

Figure 9:
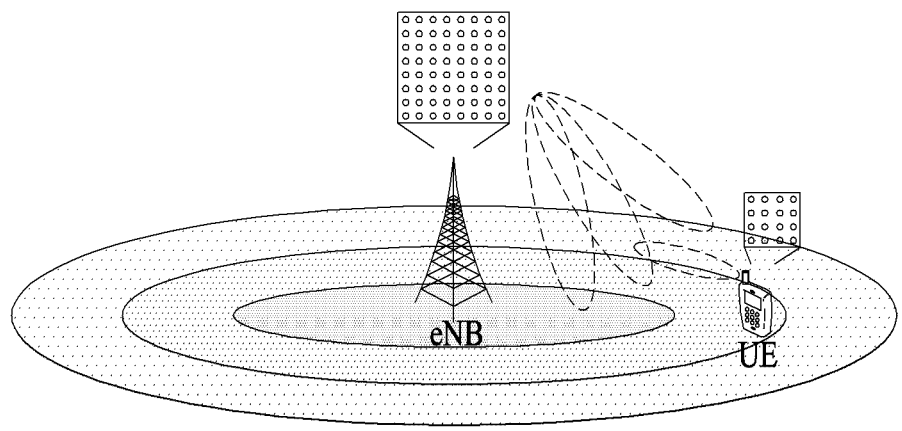
FIG. 9 is a conceptual diagram illustrating a 3D beampattern based on the 2D antenna array.

When using the 3D beam pattern in terms of Tx antenna, semi-static or dynamic beam may be formed not only in the horizontal direction of the beam, but also in the vertical direction of the beam. For example, application of the vertical directional sector formation may be considered. In addition, when the receive (Rx) beam is formed using large-scale antennas in terms of the Rx antenna, signal power may increase according to the antenna array gain. On uplink, the BS may receive signals from the UE through the plurality of antennas. In this case, the UE may have a very low Tx power in consideration of large-scale Rx antennas so as to reduce influence of interference. FIG. 9 is a conceptual diagram of the above-mentioned example, and is a conceptual diagram illustrating the system including a plurality of Tx/Rx antennas through which the BS or UE can form the AAS-based 3D beam.

In accordance with the embodiment of the present invention, the FDM (frequency division multiplexing)+TDM (time division multiplexing) scheme may group antenna ports of reference signals (RSs) transmitted to the same OFDM symbol, and may group physical antenna elements, such that the respective antenna ports contained in the antenna port group can transmit signals through the plurality of antenna elements of different antenna element groups. In accordance with the proposed scheme, the codebook for a precoding matrix for data transmission and CSI report may be implemented by combination of a selection codebook for selecting the antenna port group and a constant modulus codebook for determining a beam pattern to be used in the selected antenna port group.

In the proposed scheme, the selected codebook may be used to indicate specific information indicating which one of the antenna port groups will be used. The constant modulus codebook may indicate specific information to which precoding will be applied to ports contained in the corresponding antenna port group.

[Tx Power Limitation Per Antenna]

Assuming that the number of BS antennas is $N_t$ and the maximum Tx power of the BS transmitter is set to $P_t$[Watt], the maximum Tx power capability for each antenna may be denoted by $P_a = P_t/N_t$ that is considered most efficient in terms of the size and cost of the antenna amplifier. In this case, the amplifier per antenna is comprised of an independent element, such that Tx power exchange between the antenna amplifiers may be impossible. In other words, Tx power capability for each antenna must be fully consumed so that signals can be transmitted at a maximum Tx power of the BS transmitter.

In the OFDM transmission scheme, a specific subcarrier of the Tx OFDM symbol of each antenna port will hereinafter be referred to as a resource element (RE), and RE of the k-th subcarrier of the n-th OFDM symbol of the n-th antenna port is denoted by RE(k,1,n). Average energy to be transmitted for each RE of each antenna port will hereinafter be referred to as energy per resource element (EPRE). In the method for transmitting an OFDM composed of K subcarriers each having a transmission time (T), the entire average transmission energy obtained by the energy sum of all antennas for each RE may be denoted by $E_t = T \cdot P_t/K$. The average Tx energy (i.e., EPRE) for each RE of each antenna port may be denoted by $E_t = T \cdot P_a/K$. K subcarriers may be amplified and transmitted by a single amplifier, such that Tx power can be easily exchanged between the subcarriers. That is, the entire Tx energy of K subcarriers at the same OFDM symbol need not exceed the energy denoted by $K \cdot E_a$.

[Antenna Port Mapping]

The antenna port may not denote a substantial (physical) antenna element as a logical antenna concept. Therefore, the antenna port may be referred to as a virtual antenna, and the antenna element may be referred to as a physical antenna. The method for mapping each logical antenna port to the physical antenna element is of importance to the entire MIMO system design. As the antenna mapping scheme, not only the one-to-one mapping scheme in which a single antenna port is mapped to a single antenna element, but also the one-to-multiple mapping scheme in which a single antenna port is mapped to a plurality of antenna ports may be considered.

The mapping from the antenna port to the antenna element may be denoted by a virtualization matrix (B) as represented by the following equation 1. In Equation 1, x may be a transmission signal at the antenna port, and z may be a Tx signal at the antenna element. Whereas the number of antenna ports may be less than the number of antenna elements, the number of antenna ports may be denoted by $N_t$ for convenience of description and better understanding of the present invention. $b_n$ is a virtualization vector for indicating the relationship in which the n-th antenna port is mapped to the antenna elements. Assuming that there is a single non-zero element of the virtualization vector ($b_n$), this means the one-to-one mapping scheme. Assuming that a plurality of non-zero elements of the virtualization vector ($b_n$) is present, this means the one-to-multiple mapping scheme.

$$z = Bx = [b_0 b_1 \ldots b_{N_t-1}] x \quad \text{[Equation 1]}$$

In Equation 1, in order to adjust the signal energy at the antenna port to be identical to the signal energy at the antenna element, a virtualization vector may be denoted by $\|b_n\|=1$ such that it is assumed that the virtualization vector was normalized.

[Data Precoding and Reception (Rx) Signal]

For transmission of data having R Tx data layers, the Tx data symbol vector may be transmitted through each of the $N_t$ antennas through precoding as denoted by the following equation 2. In order to implement Tx power denoted by the maximum power ($P_t$), the precoding matrix (W) may allow the respective elements to have the same size (i.e., $|w_{i,j}|^2 = 1/R$). The number (R) of data layers simultaneously transmitted may be referred to as the number of streams or the number of ranks.

$$x = \sqrt{E_a} \, Ws = \sqrt{E_a} \begin{bmatrix} w_{0,0} & w_{0,1} & \cdots & w_{0,R-1} \\ w_{1,0} & w_{1,1} & \cdots & w_{1,R-1} \\ \vdots & \vdots & \ddots & \vdots \\ w_{N_t-1,0} & w_{N_t-1,1} & \cdots & w_{N_t-1,R-1} \end{bmatrix} \begin{bmatrix} s_0 \\ s_1 \\ \vdots \\ s_{R-1} \end{bmatrix} \quad \text{[Equation 2]}$$

-continued $$z = Bx = \sqrt{E_a}\, BWs = \sqrt{E_a}\begin{bmatrix} w'_{0,0} & w'_{0,1} & \cdots & w'_{0,R-1} \\ w'_{1,0} & w'_{1,1} & \cdots & w'_{1,R-1} \\ \vdots & \vdots & \ddots & \vdots \\ w'_{Nt-1,0} & w'_{Nt-1,1} & \cdots & w'_{Nt-1,R-1} \end{bmatrix}\begin{bmatrix} s_0 \\ s_1 \\ \vdots \\ s_{R-1} \end{bmatrix}.$$ [Equation 3]

The Tx signal of Equation 3 may be received by the receiver having $N_r$ Rx antennas after passing through the channel, and the received signal may be denoted by the following equation 4. In Equation 4, H may be a ($N_r \times N_t$) channel matrix, and n may be an ($N_r \times 1$) noise vector.

$$y = Hz + n = \sqrt{E_a} HBWs + n$$ [Equation 4]

For data demodulation, the effective channel (H·B·W) must be recognized, and a method for directly estimating the effective channel through DM-RS transmission may also be possible. However, the channel matrix (H·B) must be estimated to determine the precoding matrix (W) for maximizing Tx efficiency.

$$H \cdot B = \tilde{H} = [\tilde{h}_0 \tilde{h}_1 \ldots \tilde{h}_{N_t-1}]$$ [Equation 5]

In Equation 5, the effective channel matrix $\tilde{H}$ may be represented by $N_t$ channel column vectors. $\tilde{h}_n$ may denote an effective channel between the n-th Tx antenna port and the $N_r$ Rx antennas. During estimation of the effective channel matrix, an independent RS is transmitted at each antenna port such that each effective channel vector $\tilde{h}_n$ may be independently estimated. For channel estimation accuracy, RS for each antenna port must be transmitted through orthogonal resources. That is, in order to transmit the RS for the 0-th antenna port as denoted by Equation 2, the precoding matrix is a column vector having "Rank=1", such that all elements other than the first element must be zero (i.e., $|w_i|^2 = 0$, ($i \neq 0$)). In this case, the first element ($w_0$) may have the magnitude denoted by $\sqrt{N_t}$. Since the data symbol is transmitted with energy ($N_t \cdot E_a$), the data symbol must be transmitted with the same Tx energy such that it has the same cell coverage.

[FDM Transmission Scheme for RS]

Figure 10:
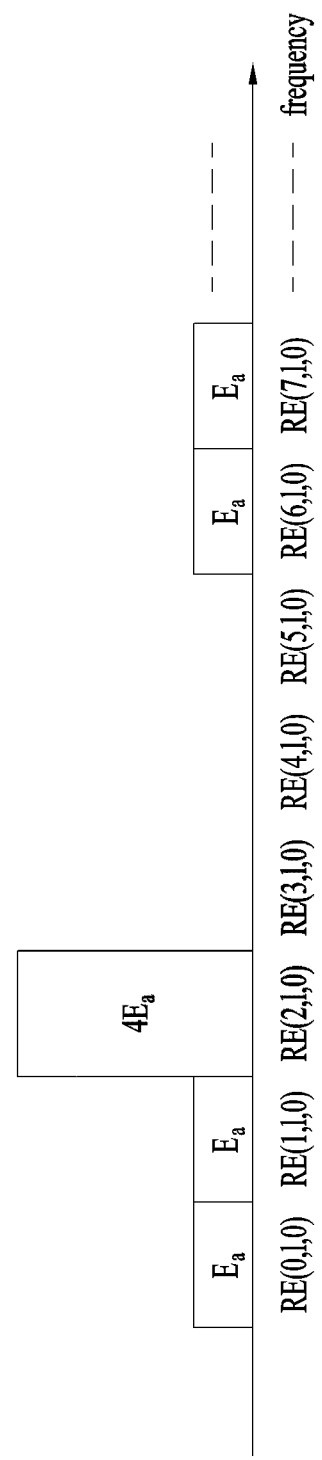
FIG. 10 is a conceptual diagram illustrating an Energy Per Resource Element (EPRE) of a specific antenna port.

In accordance with the scheme for FDM-processing the RS for the $N_t$ antenna ports and transmitting the FDM-processed RS, when RS of the $n_i$-th port is transmitted at RE($k_i$,1,$n_i$) and RS of the $n_j$-th port is transmitted at RE($k_j$,1,$n_j$), no signal is transmitted to RE($k_i$,1,$n_j$) and RE($k_j$,1,$n_i$), such that RS Tx power may increase at RE($k_i$,1,$n_i$) and RE($k_j$,1,$n_j$). The reason why the above-mentioned operations are performed is that Tx power can be exchanged between the subcarriers. FIG. 10 is a conceptual diagram illustrating an exemplary EPRE transmitted to RE of the 0-th antenna port according to the scheme for transmitting the RS of the n-th antenna port to the subcarrier corresponding to k=2+n at $N_t$=4. The muting operation in which no signal is transmitted to prevent occurrence of RS interference transmitted from the other port in the 0-th antenna port at the RE having "k=3, 4, 5" is performed, such that energy transmittable at the corresponding RE may be transferred to RE(2, 1,0) to which RS of the 0-th antenna port is transmitted, and the resultant energy is then transmitted. In FIG. 10, the data symbol is transmitted to RE having (k=0, 1, 6, 7), and the exemplary EPRE having the data symbol is shown. From the viewpoint of EPRE per antenna, whereas EPRE of the RS transmission RE is larger than EPRE of the data transmission RE by a predetermined size corresponding to $N_t$ times, the RS Tx energy may be identical to the data Tx energy from the viewpoint of energy of the sum of Tx energy of all antennas.

In order to measure the channel of the entire band in the frequency selective fading environment, RS may be repeatedly transmitted on the frequency domain at intervals of a predetermined time. RS must be transmitted at least one time at intervals of a channel coherence bandwidth ($BW_c$), such that the spacing of subcarriers to which the RS of the same antenna port is transmitted must be smaller than $T \cdot BW_c$. Assuming that a total number ($N_t$) of antennas is higher than $T \cdot BW_c$, it is impossible for all RSs for each of the $N_t$ antenna ports to be transmitted according to the FDM scheme. Therefore, the TDM or CDM scheme must be additionally considered to transmit a large number of RSs.

[FDM+TDM Transmission Scheme for RS]

Figure 11:
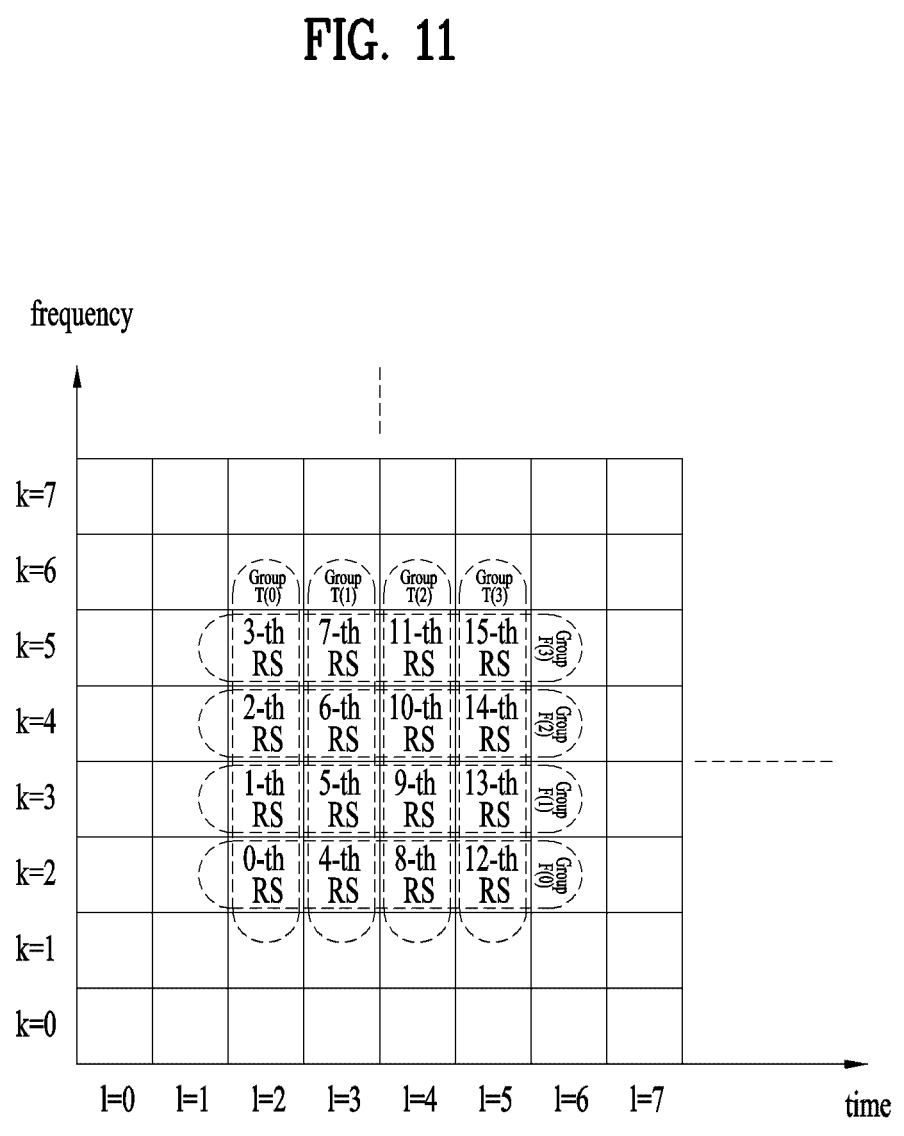

The FDM+TDM scheme may combine $M_f$ resources of the frequency domain with $M_t$ resources of the time domain, and may transmit $N_t$ RSs using $N_t = M_f M_t$ REs. FIG. 11 is a conceptual diagram of the FDM+TDM scheme, and may transmit 16 RSs to a total of 16 REs using 4 subcarriers and 4 OFDM symbols on the OFDM resource grid. The 0-th antenna port may transmit the RS to RE(2,2,0), and may perform muting at RE to which RS of the other antenna port is transmitted. Since Tx power can be exchanged between the subcarriers, Tx energy at RE(k,2,0) (where k=3, 4, 5) can be applied to RE(2,2,0). If Tx energy is transmitted at different times, Tx energy cannot be exchanged, such that it is impossible for the Tx energy at RE(k,1,0)(where k=2, . . . , 5, l=3,4,5) to be applied to RE(k,2,0).

[Properties of Antenna Virtualization Matrix]

The present invention discloses the antenna port mapping scheme for increasing Tx energy of the FDM+TDM RS transmission scheme in a Tx power limitation state of the antenna element amplifier. In the present invention, antenna virtualization denoted by Equation 1 may be used to implement Rx transmission energy ($N_t \cdot E_a$) in the FDM+TDM RS transmission scheme. One antenna port is transmitted to $M_t$ antenna elements according to the antenna mapping scheme, such that Tx capability of $M_t$ antenna elements can be fully used. In conclusion, according to the FDM+TDM RS transmission scheme, RS Tx energy is boosted $M_f$ times through Tx power exchange between FDM-processed RSs, and Tx power is boosted $M_t$ times according to the one-to-multiple antenna mapping scheme.

For convenience of description, antenna ports of RSs transmitted in the same OFDM symbol are grouped into one group, and the antenna ports are disjointly grouped. Antenna ports from the $i \cdot M_f$-th antenna port to the $(i+1) \cdot M_f - 1$-th antenna port may be referred to as the group T(i) in consideration of the antenna port index of FIG. 11. In addition, $N_t$ antenna elements are divided by $M_t$ to create $M_f$ groups, such that the i-th antenna element group will hereinafter be referred to as the group E(i).

In accordance with the proposed scheme, one antenna port is mapped to all antenna elements belonging to a single antenna element group E(i). That is, the antenna port may be one-to-one mapped to the antenna element group. In addition, antenna ports contained in the same group T(i) may be mapped to different antenna element groups. Antenna elements applied to the antenna port group T(i) and the antenna port group T(j) may be grouped in different ways. However, the scope of the present invention is limited to the case in which the grouping scheme of the antenna elements are maintained for convenience of description and better understanding of the present invention. Specifically, a representative example in which antenna elements from the $i \cdot M_t$-th antenna element to the $(i+1) \cdot M_t-1$-th antenna element are grouped into the group E(i). In this case, antenna ports mapped to the same antenna element group are grouped, and the grouped antenna ports will hereinafter be defined as the antenna port group F(i).

The proposed scheme will hereinafter be described according to characteristics of the antenna virtualization matrix. The antenna virtualization matrix B of Equation 1 will hereinafter be represented by $M_t$ matrices as represented by the following equation 6.

$$B = [C_0 C_1 \ldots C_{M_f-1}] \quad \text{[Equation 6]}$$

In Equation 6, $C_n$ is a virtualization matrix applied to the n-th antenna port group T(n). $C_n$ may be denoted by $M_t \times 1$ column vectors as represented by the following equation 7.

$$C_n = \begin{bmatrix} c_{n,0} & 0 & \cdots & 0 \\ 0 & c_{n,1} & \cdots & 0 \\ \vdots & \vdots & \ddots & \vdots \\ 0 & 0 & \cdots & c_{n,M_f-1} \end{bmatrix} \quad \text{[Equation 7]}$$

In Equation 7, 0 may denote a ($M_t \times 1$) null vector, and $C_{n,i}$ may denote a ($M_t \times 1$) virtualization vector to indicate how the i-th antenna port of the antenna port group T(n) is mapped to the antenna element group E(i). The virtualization matrix of Equation 7 may allow each row vector to include only one non-zero element, such that each antenna element is mapped to one antenna port contained in the antenna port group T(n).

In accordance with the proposed scheme, all elements of the column vector ($C_{n,i}$) are non-zero elements and have the same size. In order to implement independent channel characteristics between the antenna ports, $C_{n,i}$ may be orthogonal to $C_{m,i}$. In order to facilitate the virtualization vector design, the $M_t \times 1$ virtual matrices applied to the antenna port group T(n) may be identical to implement $C_{n,i} = C_{n,j}$.

The i-th antenna port of the antenna port group T(n) is mapped to the same group E(i) according to Equations 6 and 7, resulting in formation of the group F(i). In FIG. 11, the group E(i) may include $M_t$ antenna ports starting from the i-th antenna port and spaced apart from one another at intervals of a predetermined distance corresponding to $M_f$ antenna ports. In the embodiment of the present invention, the respective antenna ports belonging to the group F(i) may be transmitted to the other OFDM symbol of the same subcarrier. In the proposed scheme, although RSs of the antenna ports belonging to the group T(n) should be transmitted at the same OFDM symbol, RSs of the ports contained in the groups T(n) and T(n+1) need not be transmitted to contiguous OFDM symbols.

[Application to 2D AAS]

Figure 12:
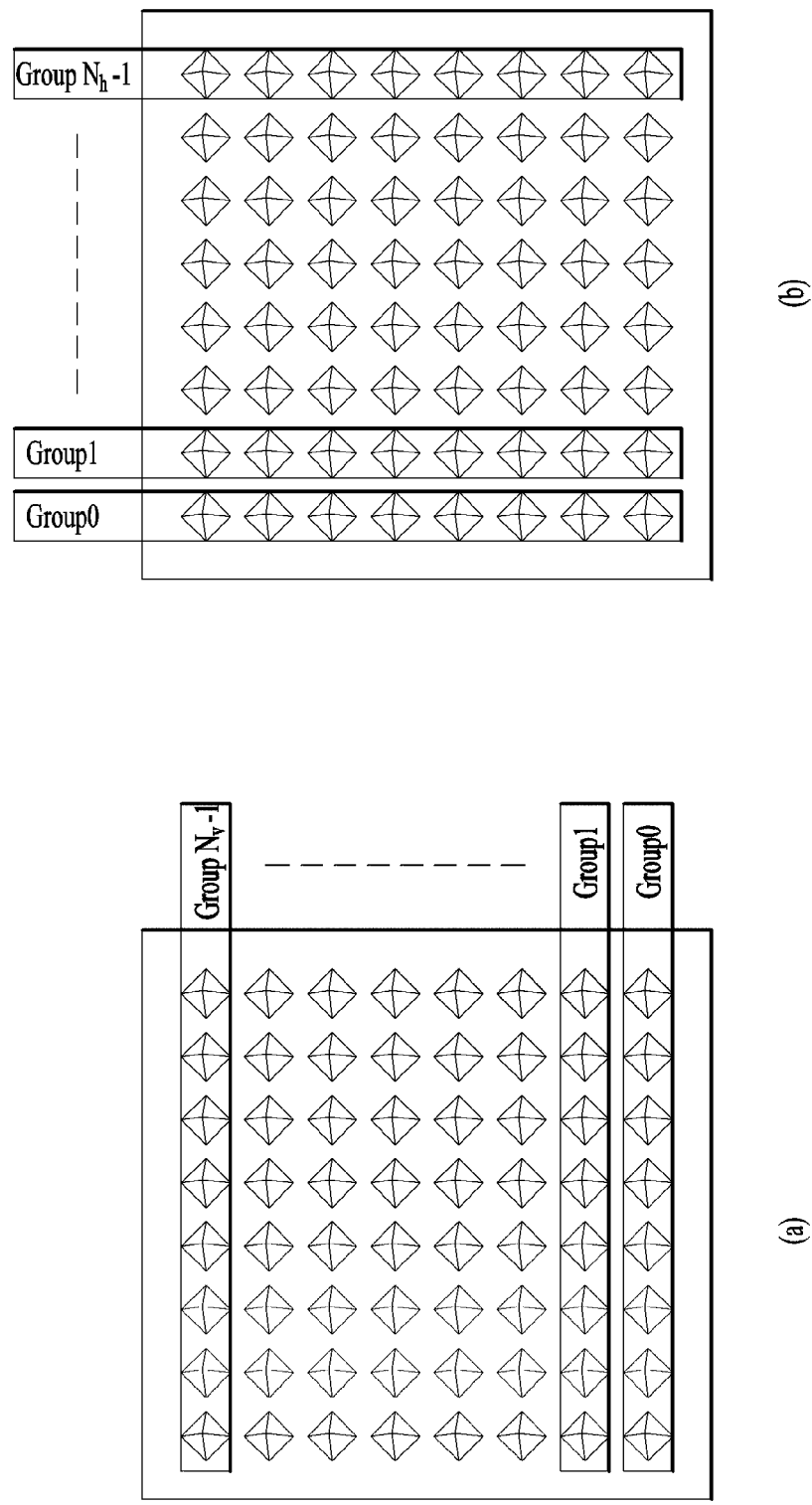

This paragraph will disclose an example in which the inventive concept is applied to 2D AAS of FIG. 12. In 2D AAS, the group of the antenna elements being one-to-multiple mapped to RS ports may be applied to the group composed of the horizontal directional antenna rows or to the other group composed of the vertical directional antenna columns. In the former case (FIG. 12a), the number of antenna elements per group is set to Mt=Nh, and the number of groups is set to $M_f = N_v$. In the latter case (FIG. 12b), $M_t = N_v$ and $M_f = N_h$ may be established.

In FIG. 12(a), one antenna port is mapped to $N_h$ antenna elements, $N_v$ antenna ports may form the group T(n), and the corresponding RSs may be transmitted at the same OFDM symbol. In FIG. 12(b), one antenna port is mapped to $N_v$ antenna elements, and $N_h$ antenna ports may form the group T(n), such that the corresponding RSs may be transmitted at the same OFDM symbol.

[Codebook Property of 2D AAS, Kronecker Product]

In 2D AAS, as the spacing between the antenna elements is reduced, the 3D beam shape may be denoted by the product of the horizontal beam and the vertical beam. Therefore, the codebook denoted by the Kronecker product between the horizontal antenna precoding matrix $W_D^{(H)}$ and the vertical antenna precoding matrix $W_D^{(v)}$ may be considered to be the codebook to be used in 2D AAS. By the indexing order of the antenna ports of FIG. 11, the example of FIG. 12(a) is denoted by the following equation 8, and the Kronecker product is denoted by the following equation 9 as shown in FIG. 12(b).

$$W_D = W_D^{(H)} \otimes W_D^{(v)} \quad \text{[Equation 8]}$$

$$W_D = W_D^{(v)} \otimes W_D^{(H)} \quad \text{[Equation 9]}$$

If the rank of $W_D^{(H)}$ is denoted by $R_H$, and the rank of $W_D^{(v)}$ is denoted by $R_V$, the overall precoding rank is denoted by $R_H \cdot R_V$. The aggregate (or set) of the horizontal antenna precoding matrices is defined as the codebook $CB^{(H)}(N_h)$ of the horizontal antenna, and the aggregate (or set) of the vertical antenna is defined as the codebook $CB^{(v)}(N_v)$ of the vertical antenna.

Considering the above-mentioned mapping scheme between the antenna ports and the antenna elements, the selection codebook is used as the horizontal antenna codebook and the constant modulus codebook is used as the vertical antenna codebook as shown in FIG. 12(a). In contrast, the selection codebook is used as the vertical antenna codebook and the constant modulus codebook is used as the horizontal antenna codebook as shown in FIG. 12(b). In this case, the selection codebook may indicate the codebook in which only the matrix composed of column vectors each having a single non-zero element is used as the precoding matrix. The constant modulus codebook may indicate the codebook in which only the matrix in which each element has the same size is used as the precoding matrix. The above-mentioned codebook may allow the respective elements of the final precoding matrix (B·W) used in the Tx signal of Equation 3 to have the same size.

In the proposed scheme, the selection codebook may indicate specific information indicting which group will be selected from among $M_t$ antenna port groups T(n) and then used. The constant modulus codebook may indicate which precoding will be applied to the antenna ports contained in the corresponding antenna port group.

[Method for Constructing Selection Codebook]

The antenna port selection codebook of the antenna size (N) is composed of only selection vectors, each having a single non-zero element used as the precoding vector corresponding to Rank=1, and the precoding matrix corresponding to Rank>1 is composed of the matrix in which each row is denoted by a selection vector. Table 8 shows the example of the precoding matrix corresponding to Rank=1 and Rank=2 from among the selection codebook having the antenna size of 4. The antenna port selection codebook having the antenna size of N may have M codebooks (corresponding to Rank=M) selected from among N codebooks. That is, the antenna port has a combination (N,M) corresponding to the number M of selected codebooks.

In addition, the antenna ports are divided into a plurality of antenna port sets, and the codebook of Rank=M may be restricted in a manner that M antenna ports are selected from among the same antenna port set. For example, when the antenna port set (or aggregate) of the antenna port selection codebook having the antenna size of N is divided into two sets, the Rank=M codebook may include 2*combination(N/2,M) corresponding to a specific number for selecting M ports from among N/2 ports contained in each set from among 2 antenna port sets. If the antenna port sets contained in the antenna port selection codebook having the antenna size of N are divided into G antenna port sets, the Rank=M codebook may include G*combination(N/G,M) corresponding to a specific number for selecting M ports from among N/G ports contained in each set from among G antenna port sets.

The proposed scheme may be applied to the exemplary case in which Tx beams of N antenna ports are not orthogonal to each other. Only the ports obtained by orthogonal Tx beams of the antenna ports may be composed of the set (or aggregate). That is, the Tx beams are orthogonal to each other between the ports contained in the antenna port set (or aggregate). Tx beams may not be orthogonal to each other between the ports contained in the other antenna port set. Therefore, the Rank=M codebook may allow only the antenna ports contained in the same antenna port set to be selected, so that orthogonality between Tx layers can be guaranteed.

A maximum rank of the antenna port selection codebook may be pre-designated, and the codebook applicable to each rank may be restricted by the bitmap indicator of RRC signaling.

TABLE 8

| Rank = 1 | Rank = 2 |
|---|---|
| $\begin{bmatrix}1\\0\\0\\0\end{bmatrix}, \begin{bmatrix}0\\1\\0\\0\end{bmatrix}, \begin{bmatrix}0\\0\\1\\0\end{bmatrix}, \begin{bmatrix}0\\0\\0\\1\end{bmatrix}$ | $\begin{bmatrix}1&0\\0&1\\0&0\\0&0\end{bmatrix}, \begin{bmatrix}1&0\\0&0\\0&1\\0&0\end{bmatrix}, \begin{bmatrix}1&0\\0&0\\0&0\\0&1\end{bmatrix}, \begin{bmatrix}0&0\\1&0\\0&1\\0&0\end{bmatrix}, \begin{bmatrix}0&0\\1&0\\0&0\\0&1\end{bmatrix}, \begin{bmatrix}0&0\\0&0\\1&0\\0&1\end{bmatrix}$ |

[Non-Kronecker Product Codebook Generalization]

The inventive concept of the present invention is generalized so that the present invention provides the codebook design and the associated CSI reporting scheme for use in the normal case in which the 3D beam shape is not denoted by the product between the horizontal beam and the vertical beam because the spacing of the antenna elements is gradually increased in 2D AAS. For convenience of description, the exemplary case of FIG. 12(b) will be given. However, V and H are mutually exchanged with each other and may also be equally applied to the exemplary case of FIG. 12(a).

The generalized codebook of the proposed scheme is represented by the following equation 10.

$$W_D = [w_0^{(v)} \otimes W_0^{(H)} w_1^{(v)} \otimes W_1^{(H)} \ldots$$
$$w_{R_V-1}^{(v)} \otimes W_{R_V-1(H)}]. \quad \text{[Equation 10]}$$

In Equation 10, $W_D^{(v)}$ is denoted by $W_D^{(v)} = [w_0^{(v)} w_1^{(v)} \ldots w_{R_V-1}^{(v)}]$.

In Equation 10, $W_D^{(v)}$ may be selected from the antenna port selection codebook, and $W_D^{(H)}$ may be selected from the constant modulus codebook. $R_V$ may indicate the number of antenna port groups selected as Rank of $W_D^{(v)}$, and $W_r^{(v)}$ may indicate which antenna port group is selected as the r-th selected antenna port selection vector acting as the antenna port selection vector. $W_r^{(H)}$ may indicate the precoding applied to the r-th selected antenna port group. If $W_r^{(H)}$ rank is denoted by $R_H(r)$, the overall precoding rank is represented by the following equation 11.

$$\sum_{r=0}^{R_V-1} R_H(r) \quad \text{[Equation 11]}$$

That is, the rank of the overall precoding may indicate the sum of ranks of the precoding matrices applied to the respective selected antenna port groups.

[CSI-RS Configuration]

$N_t$ antenna port CSI-RSs according to the proposed scheme may be grouped into a plurality of groups, and the RS of the antenna ports belonging to the same group may be transmitted at the same OFDM symbol. That is, the antenna ports of RSs transmitted at the same OFDM symbol may form a single group, or RSs of several antenna port groups may also be transmitted at the same OFDM symbol. If $N_t$ antenna port CSI-RSs are grouped into $M_t$ groups, and if the number of RSs belonging to the m-th RS group is defined as $M_f(m)$, the following relationship must be satisfied.

[Equation 12]

$$N_t = \sum_{m=0}^{M_t-1} M_f(m)$$

The proposed scheme is simplified, such that the number of antenna ports per group may be identical. In this case, $M_f(m) = N_t/M_t$ may be given.

$N_t$ antenna port CSI-RSs may be grouped into a plurality of groups, and CSI-RS of the ports belonging to the same group may use the legacy CSI=RS transmission pattern of FIG. 7. In this case, the number of antenna ports contained in a single group may be selected from among 1, 2, 4, and 8. CSI-RSs of the ports belonging to the same group may be multiplexed according to the FDM+CDM scheme of FIG. 7, and then transmitted. However, RSs of the ports belonging to the other group may be transmitted to the other OFDM symbol. In this structure, the entire CSI_RS may be processed according to the FDM+CDM+TDM scheme, and then transmitted.

When the base station (BS) configures the proposed CSI-RS in the UE, the following information may be transmitted as the CSI-RS configuration.

A total number of antenna ports
The number of antenna port groups
The number of antenna ports for each group
Position of CSI-RS transmission resource for each group
CSI-RS transmission period and offset for each group
Pc for each antenna port group Here, Pc is the ratio of PDSCH EPRE to CSI-RS EPRE. Pc may be assumed for CSI report, and may be a parameter for deciding the quality of a PDSCH. In this case, another value (Pc) per antenna port group is applied so that another Tx power configuration may be established between data layers transmitted from the respective antenna port groups.

Although the position of the CSI-RS transmission resource per antenna port group may be independently designated through CSI-RS configuration, only the CSI-RS transmission resource position of the first group is notified, the CSI-RS transmission resource position of the remaining group may be pre-designated as the relative position of the first group. Although the CSI-RS transmission period and offset may be equally established in all the antenna port groups, another transmission period and offset per antenna port group may be established to increase CSI-RS transmission efficiency. Specifically, when RSs of all antenna port groups of CSI-RS are not transmitted in the same subframe due to insufficient resources, RSs of all the antenna port groups are transmitted at intervals of the same time, different offsets of the Tx subframe may be allocated to the respective antenna port groups.

[Activation/Deactivation for Each Antenna Port Group]

In order to reduce CSI-RS transmission overhead, the BS may stop transmission of the corresponding CSI-RS when transmission of a specific CSI-RS is unnecessary. In the case of CSI-RS pre-established in UEs, the corresponding CSI-RS may inform the corresponding UEs that the corresponding CSI-RS is deactivated through MAC or RRC signaling, such that CSI estimation for the corresponding CSI-RS is no longer carried out.

The above-mentioned scheme is applied to CSI-RS configuration composed of a plurality of antenna port groups, such that the BS may indicate whether CSI-RS transmission per antenna port group is activated or deactivated. That is, when the BS informs the UE of the CSI-RS activation/deactivation commands, the BS may indicate which antenna port group in a certain CSI-RS configuration is activated or deactivated.

The UE may exclude the antenna port group deactivated by the activation/deactivation command of the BS from the antenna port selection. That is, some codebooks of the antenna port selection codebooks may be automatically restricted. For example, upon receiving a specific command indicating that the fourth antenna port group is deactivated when the CSI-RS configuration composed of four antenna port groups is established, the UE may automatically restrict the codebook for selecting the fourth antenna port group from among the antenna port selection codebook of Table 8, such that the UE may not select the corresponding codebook during CSI reporting.

[CSI-RS Feedback]

This paragraph will disclose the CSI reporting method for the CSI-RS configuration composed of the plurality of antenna port groups.

In the proposed scheme, the UE may report specific information indicating which antenna port group will be selected using the antenna port selection codebook. The number of selected antenna port groups may be decided by the rank of the reported antenna port selection precoding matrix $W_D^{(v)}$. In addition, the UE may report specific information indicating whether data will be transmitted to the r-th selected antenna port group using a certain precoding matrix $W_r^{(H)}$. In this case, the precoding matrix applied to the antenna port group is selected from among the constant modulus codebook.

In the proposed scheme, the UE may report the rank $R_V$ and the precoding matrix $W_D^{(v)}$ for selecting the antenna port group for CSI report. For the precoding operation to be applied to each selected antenna port group, $R_V$ ranks ($R_H(r)$) and the precoding matrix $W_r^{(H)}$ may be reported. The UE may report the CQI capable of being acquired when the reported precoding matrices are applied. In this case, the report period of each report item may be established in different ways. For example, the report period of Rank $R_V$ may be equal to or larger than the report period of the precoding matrix $W_D^{(v)}$. That is, assuming that Rank $R_V$ is reported once at intervals of 500 subframes, $W_D^{(v)}$ may be reported once at intervals of 100 subframes. In addition, the report period of the precoding matrix $W_D^{(v)}$ may be identical to or larger than the rank $R_H(r)$ or the report period of $W_r^{(H)}$.

In addition, the report period of Rank $R_H(r)$ may be identical to or larger than the report period of the precoding matrix $W_r^{(H)}$.

In addition, the frequency band to which each report item is applied may be established in different ways. That is, after channel measurement for each band is carried out, each report item may be independently selected and reported, and the bandwidth size of each report item may be established in different ways. For example, the bandwidth size independently decided by Rank $R_V$ may be identical to or larger than the bandwidth size of the precoding matrix $W_D^{(v)}$. That is, if Rank $R_V$ is determined and reported once at intervals of 100 RBs, $W_D^{(v)}$ may be determined and reported once at intervals of 20 RBs. Alternatively, whereas only one value regarding the Rank $R_V$ is reported throughout the system band, $W_D^{(v)}$ may be reported for each sub-band. In addition, the bandwidth for deciding the precoding matrix $W_D^{(v)}$ may be identical to or larger than the rank $R_H(r)$ or the decision band of $W_r^{(H)}$. In addition, the decision band of the Rank $R_H(r)$ may be identical to or larger than the decision band of the precoding matrix $W_r^{(H)}$. For example, only one value regarding the precoding matrix $W_D^{(v)}$ may be reported over the system band, and $W_r^{(H)}$ may be reported for each sub-band.

In accordance with modification of the proposed scheme, the UE may report the Rank $R_H(m)$ and the precoding matrix $W_m^{(H)}$, each of which is e applied to the respective antenna port groups, so as to perform CSI reporting. That is, assuming that $M_t$ antenna port groups are present, $M_t$ ranks $R_H(m)$ and the precoding matrix $W_m^{(H)}$ can be reported. In this case, assuming data transmission is not desired by the m-th antenna group, the UE may report "$R_H(m)=0$" and may not report the precoding matrix $W_m^{(H)}$.

In accordance with simplification of the proposed scheme, the entire precoding matrix is represented by the Kronecker product of Equation 9. The UE may report the Rank $R_V$ and the precoding matrix $W_D^{(v)}$ for selecting the antenna port group so as to perform CSI reporting, and may report the Rank $R_H$ and the precoding matrix $W_D^{(H)}$ so as to perform precoding applied to the selected antenna port groups. The UE may report the CQI capable of being acquired when the reported precoding matrices are applied. Assuming that the report period of the CSI information (X) is denoted by Period(X), Period($R_V$)≥Period($W_D^{(v)}$)≥Period($R_H$)≥Period ($W_D^{(H)}$) may be established. Alternatively, Period($R_V$)≥Period($R_H$)≥Period($W_D^{(v)}$)≥Period ($W_D^{(H)}$) may also be established.

In addition, assuming that the decision band of CSI information (X) is denoted by Bw(X), Bw($R_V$)≥Bw ($W_D^{(v)}$)≥Bw($R_H$)≥Bw($W_D^{(v)}$) may be established. Alternatively, Bw($R_V$)≥Bw($R_H$)≥Bw($W_D^{(v)}$)≥Bw($W_D^{(v)}$) may be established. For example, the UE may determine only one value regarding ($R_V$, $W_D^{(v)}$, $R_H$) for the entire system band, and may report the determined value. $W_D^{(H)}$ may be reported for each sub-band. Alternatively, the UE may determine and report only one value ($R_V$ or $R_H$) for the entire system band, and each of $W_D^{(H)}$ and $W_D^{(v)}$ may be reported for each sub-band.

In the case of $R_H=2$ in the transmission scheme of Equation 9, the first data layer and the second data layer may be transmitted through the same antenna port group. In order to transmit contiguous data layers through other antenna port groups, the precoding matrix of Equation 9 should be modified as shown in the following equation 13.

$$W_D = [W_D^{(V)} \otimes w_0^{(H)} W_D^{(V)} \otimes w_1^{(H)} \ldots$$
$$W_D^{(V)} \otimes w_{R_H-1}^{(H)}]. \qquad \text{[Equation 13]}$$

In Equation 13, $W_D^{(H)}$ may be denoted by $W_D^{(H)} = [w_0^{(H)} w_1^{(H)} \ldots w_{R_H-1}^{(H)}]$.

The grouped antenna ports of the CSI-RS configuration to which the antenna port grouping proposed by the present invention is applied are defined as the sub CSI-RS, such that the CSI-RS configuration composed of the plurality of sub CSI-RSs may be constructed. Alternatively, several CSI-RS configurations are combined so that the super CSI-RS may also be established.

Figure 13:
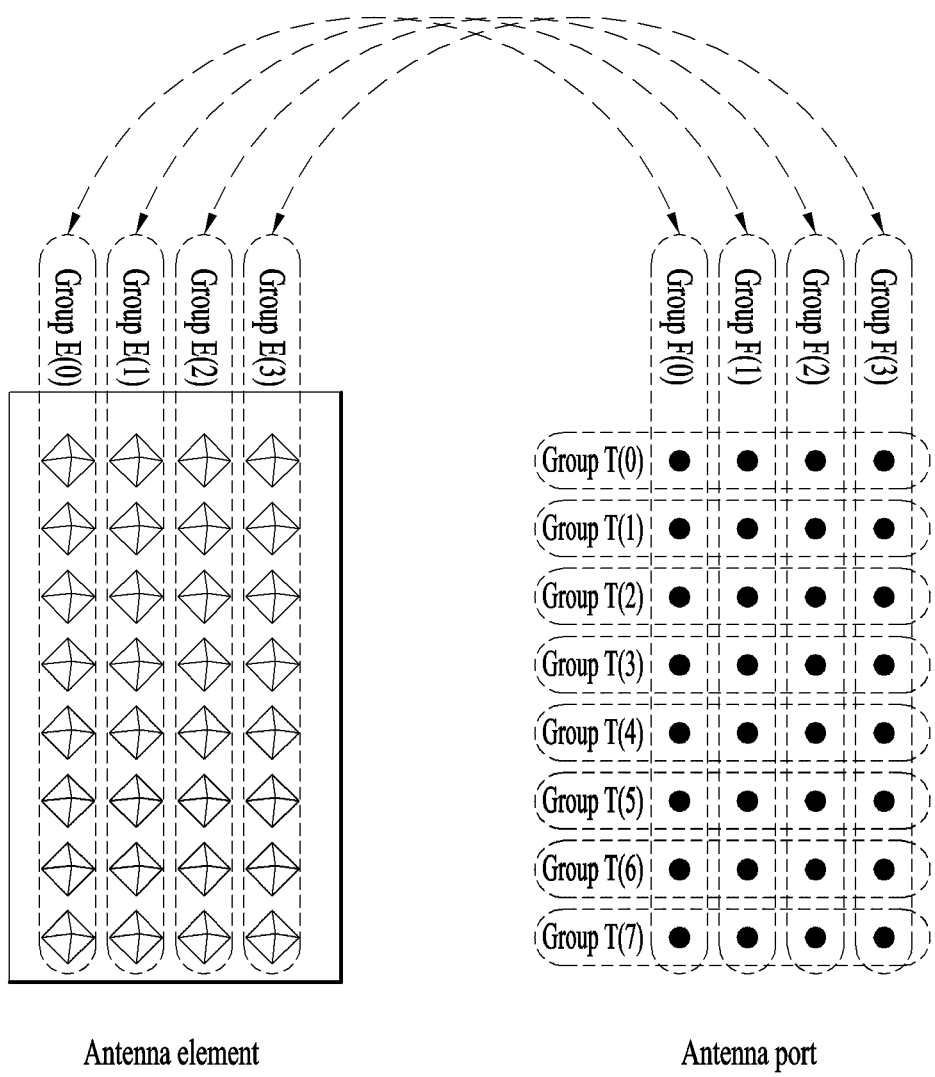
FIG. 13 is a conceptual diagram illustrating an antenna port group and an antenna element group.

The exemplary case in which the embodiment of the present invention is applied to 2D AAS having 32 antenna elements will hereinafter be described with reference to FIG. 13. The left side of FIG. 13 indicates physical antennas acting as 32 antenna elements, and the right side of FIG. 13 may indicate logical antennas acting as 32 antenna ports. FIG. 13 is a conceptual diagram illustrating the grouping method of antenna elements and the grouping method of antenna ports, and may also indicate the mapping relationship between the antenna elements and the antenna ports.

The embodiment of FIG. 13 corresponds to FIG. 12b in which the antenna elements are grouped by the vertical directional antenna column. The antenna elements are classified into four groups (E(0), E(1), E(2), E(3)). 32 antenna ports are divided into four groups, resulting in formation of the four groups (F(0), F(1), F(2), F(3)). In the example of the proposed scheme, the antenna ports contained in the group F(i) may be virtualized using all antenna elements contained in the group E(i). Each virtualization vector for each antenna port belonging to the group F(i) may be established in different ways. In addition, only one port is selected from each antenna port group, resulting in formation of the group T(i). The antenna ports belonging to the group T(i) may be respectively mapped to different antenna element groups using the same virtualization vector. RS for the respective antenna ports contained in the group T(i) may be transmitted to the same OFDM symbol.

Assuming that the Kronecker product of two codebooks is used as the codebook to be used for 2D AAS according to extension of the proposed scheme as shown in Equations 8 and 9, if the Kronecker product of the two codebooks is used, or if two codebooks are combined as shown in Equations 10 and 11, one codebook may use the constant modulus codebook, and the other codebook may be selected from among the antenna port selection codebook and the constant modulus codebook and then used. The above-mentioned scheme has flexibility in which the codebook is selected and used according to the CSI-RS transmission method of the BS. In this case, the UE may determine whether the CSI will be reported using the antenna port selection codebook, or may determine whether the CSI will be reported using the constant modulus codebook. In more detail, the BS may determine whether the codebook to be applied to $W_D^{(v)}$ through RRC signaling needed to transmit the MIMO transmission mode is the antenna port selection codebook or the constant modulus codebook.

If the Kronecker product of two codebooks is used as the codebook to be used in 2D AAS according to extension of the proposed scheme as shown in Equations 8 and 9, or if the Kronecker product is composed of a combination of two codebooks as shown in Equations 10 and 11, one codebook may use the constant modulus codebook, and the other codebook may use the mixed codebook implemented by a combination of the antenna port selection precoder and the constant modulus precoder. In this case, the BS may apply codebook restriction to the mixed codebook according to the CSI-RS transmission scheme, such that only a specific kind of precoder (i.e., the antenna port selection precoder or the constant modulus precoders) may be used.

[CSI-RS Feedback Rank Restriction]

Rank $R_V$ for selecting the antenna port group may be limited in advance to a predetermined number of values according to the above-mentioned scheme. That is, Rank $R_V$ may be selected from among 1 and 2. Alternatively, the BS may limit the value capable of being owned by the Rank $R_V$ through RRC signaling needed to transmit the MIMO transmission mode. In addition, Rank $R_H(r)$ applied to each selected antenna port group may be limited in advance to a specific number of values. Alternatively, the Rank of the entire precoding of Equation 12 may be limited in advance to a specific number of values. The number of ranks of the entire precoding of Equation 12 may not exceed the number of UE Rx antennas or a maximum number of data layers capable of being received by the UE. Alternatively, the maximum value of Rank $R_H(r)$ applied to each antenna port group may be limited to a specific value or less according to Tx characteristics of the antenna port group. The BS may inform the UE of both a maximum value of $R_H(r)$ applied to each antenna port group and a maximum value of the entire precoding rank through RRC signaling needed to transmit the MIMO transmission mode.

Figure 14:
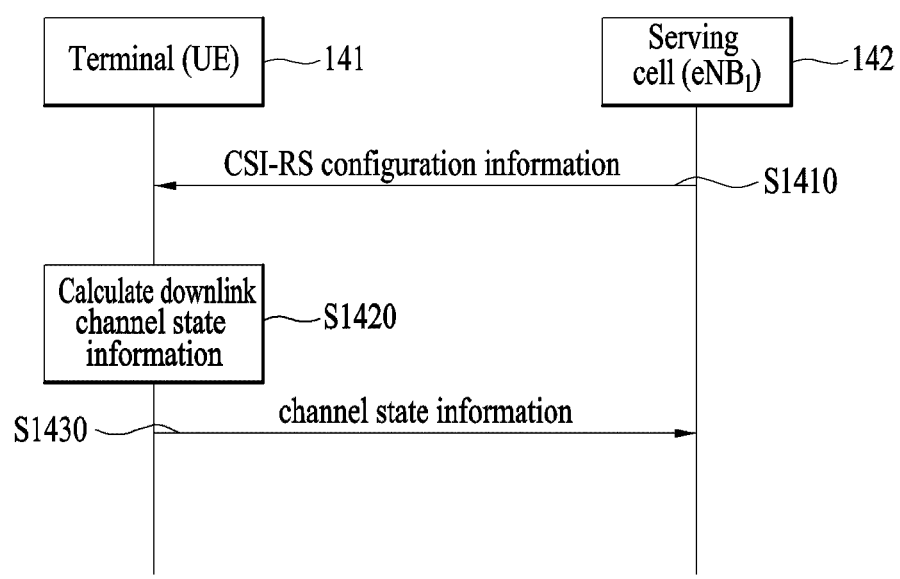
FIG. 14 is a flowchart illustrating the operations of the embodiment.

FIG. 14 is a flowchart illustrating the operations of the embodiment.

The embodiment relates to a channel state report concept for a downlink channel transmitted through $N_t$ antenna ports arranged in a 2D array. The respective $N_t$ antenna ports may be mapped to all antenna elements belonging to a specific antenna element group, and the antenna port groups corresponding to a reference signal (RS) transmitted at the same OFDM symbol are respectively mapped to different antenna element groups.

Referring to FIG. 14, the UE 141 may receive a CSI-RS configuration for reporting the channel state of the antenna port group from the serving cell 142 in step S1410.

The UE 141 may calculate channel state information (CSI) regarding the downlink channel through the received CSI-RS using the received CSI-RS configuration in step S1420.

Thereafter, the UE 141 may report the channel state information (CSI) to the serving cell in step S1430.

The reported CSI may include the precoding matrix for selecting the antenna port group and the precoding matrix to be applied to the selected antenna port group.

In addition, the precoding matrix for selecting the antenna port group may be selected from the antenna port group selection codebook. The precoding matrix to be applied to the selected antenna port group may be selected from the constant modulus codebook.

In addition, the UE may receive specific information indicating whether CSI-RS transmission is activated or deactivated for each antenna port group from the serving cell. The precoding matrix for selecting the deactivated antenna port group may be excluded from the channel state information (CSI).

In addition, the UE may receive specific information regarding rank restriction of the precoding for selecting the antenna port group from the serving cell, or may receive specific information regarding rank restriction of the precoding to be applied to the selected antenna port group from the serving cell.

UE or BS operations of FIG. 14 may include not only the above-mentioned embodiment, but also at least one of the detailed embodiments of the present invention.

Figure 15:
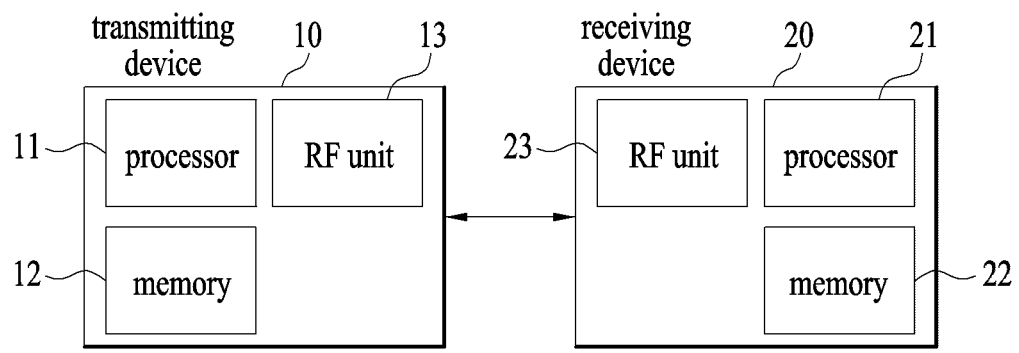
FIG. 15 is a block diagram illustrating an apparatus for implementing embodiment(s) of the present invention.

FIG. 15 is a block diagram illustrating a transmitter 10 and a receiver 20 configured to implement embodiments of the present invention. Each of the transmitter 10 and receiver 20 includes a radio frequency (RF) unit 13, 23 capable of transmitting or receiving a radio signal that carries information and/or data, a signal, a message, etc., a memory 12, 22 configured to store various kinds of information related to communication with a wireless communication system, and a processor 11, 21 operatively connected to elements such as the RF unit 13, 23 and the memory 12, 22 to control the memory 12, 22 and/or the RF unit 13, 23 to allow the device to implement at least one of the embodiments of the present invention described above.

The memory 12, 22 may store a program for processing and controlling the processor 11, 21, and temporarily store input/output information. The memory 12, 22 may also be utilized as a buffer. The processor 11, 21 controls overall operations of various modules in the transmitter or the receiver. Particularly, the processor 11, 21 may perform various control functions for implementation of the present invention. The processors 11 and 21 may be referred to as controllers, microcontrollers, microprocessors, microcomputers, or the like. The processors 11 and 21 may be achieved by hardware, firmware, software, or a combination thereof. In a hardware configuration for an embodiment of the present invention, the processor 11, 21 may be provided with application specific integrated circuits (ASICs) or digital signal processors (DSPs), digital signal processing devices (DSPDs), programmable logic devices (PLDs), and field programmable gate arrays (FPGAs) that are configured to implement the present invention. In the case which the present invention is implemented using firmware or software, the firmware or software may be provided with a module, a procedure, a function, or the like which performs the functions or operations of the present invention. The firmware or software configured to implement the present invention may be provided in the processor 11, 21 or stored in the memory 12, 22 to be driven by the processor 11, 21.

The processor 11 of the transmitter 10 performs predetermined coding and modulation of a signal and/or data scheduled by the processor 11 or a scheduler connected to the processor 11, and then transmits a signal and/or data to the RF unit 13. For example, the processor 11 converts a data sequence to be transmitted into K layers through demultiplexing and channel coding, scrambling, and modulation. The coded data sequence is referred to as a codeword, and is equivalent to a transport block which is a data block provided by the MAC layer. One transport block is coded as one codeword, and each codeword is transmitted to the receiver in the form of one or more layers. To perform frequency-up transformation, the RF unit 13 may include an oscillator. The RF unit 13 may include Nt transmit antennas (wherein Nt is a positive integer greater than or equal to 1).

The signal processing procedure in the receiver 20 is configured as a reverse procedure of the signal processing procedure in the transmitter 10. The RF unit 23 of the receiver 20 receives a radio signal transmitted from the transmitter 10 under control of the processor 21. The RF unit 23 may include Nr receive antennas, and retrieves baseband signals by frequency down-converting the signals received through the receive antennas. The RF unit 23 may include an oscillator to perform frequency down-converting. The processor 21 may perform decoding and demodulation on the radio signal received through the receive antennas, thereby retrieving data that the transmitter 10 has originally intended to transmit.

The RF unit 13, 23 includes one or more antennas. According to an embodiment of the present invention, the antennas function to transmit signals processed by the RF unit 13, 23 are to receive radio signals and deliver the same to the RF unit 13, 23. The antennas are also called antenna ports. Each antenna may correspond to one physical antenna or be configured by a combination of two or more physical antenna elements. A signal transmitted through each antenna cannot be decomposed by the receiver 20 anymore. A reference signal (RS) transmitted in accordance with a corresponding antenna defines an antenna from the perspective of the receiver 20, enables the receiver 20 to perform channel estimation on the antenna irrespective of whether the channel is a single radio channel from one physical antenna or a composite channel from a plurality of physical antenna elements including the antenna. That is, an antenna is defined such that a channel for delivering a symbol on the antenna is derived from a channel for delivering another symbol on the same antenna. An RF unit supporting the Multiple-Input Multiple-Output (MIMO) for transmitting and receiving data using a plurality of antennas may be connected to two or more antennas.

In embodiments of the present invention, the UE operates as the transmitter 10 on uplink, and operates as the receiver 20 on downlink. In embodiments of the present invention, the eNB operates as the receiver 20 on uplink, and operates as the transmitter 10 on downlink.

The transmitter and/or receiver may be implemented by one or more embodiments of the present invention among the embodiments described above.

Detailed descriptions of preferred embodiments of the present invention have been given to allow those skilled in the art to implement and practice the present invention. Although descriptions have been given of the preferred embodiments of the present invention, it will be apparent to those skilled in the art that various modifications and variations can be made in the present invention defined in the appended claims. Thus, the present invention is not intended to be limited to the embodiments described herein, but is intended to have the widest scope consistent with the principles and novel features disclosed herein.

INDUSTRIAL APPLICABILITY

The present invention is applicable to wireless communication devices such as a UE, a relay, and a BS.

The invention claimed is:

1. A method for reporting, by a terminal, a channel state regarding a downlink channel transmitted through Nt antenna ports arranged in a two dimensional (2D) shape, the method comprising:
receiving, by the terminal from a serving cell, a channel state information (CSI)-reference signal (RS) configuration for reporting the channel state regarding the Nt antenna ports, the CSI-RS configuration consisting of a plurality of CSI-RS antenna port groups from which a beamformed CSI-RS is transmitted;
calculating CSI regarding a downlink channel based on the beamformed CSI-RS related to the received CSI-RS configuration; and
reporting the calculated CSI to the serving cell,
wherein the CSI-RS configuration includes information on a number of the CSI-RS antenna port groups and a number of antenna ports of each CSI-RS antenna port group.

2. The method according to claim 1, wherein the CSI-RS configuration includes a position of CSI-RS resource of each CSI-RS antenna port group.

3. The method according to claim 1, wherein the CSI-RS configuration includes a CSI-RS transmission period and offset of each CSI-RS antenna port group.

4. The method according to claim 1, wherein each CSI-RS antenna port group has N CSI-RS antenna port(s), where N is one selected from 1, 2, 4 or 8.

5. The method according to claim 1, wherein the calculated CSI includes a precoding matrix for selecting a CSI-RS antenna port group and a precoding matrix to be applied to the selected CSI-RS antenna port group.

6. The method according to claim 1, further comprising:
receiving information regarding precoding rank restriction for selecting the CSI-RS antenna port group or information regarding precoding rank restriction to be applied to the selected CSI-RS antenna port group from the serving cell.

7. The method according to claim 1, wherein the CSI-RS configuration includes a ratio of physical downlink shared channel (PDSCH) energy per resource element (EPRE) to CSI-RS EPRE of each CSI-RS antenna port group.

8. A terminal for reporting a channel state regarding a downlink channel transmitted through Nt antenna ports arranged in a two dimensional (2D) shape, the terminal comprising:
a receiver; and
a processor configured to:
control the receiver to receive, from a serving cell, a channel state information (CSI)-reference signal (RS) configuration for reporting the channel state regarding the Nt antenna ports, the CSI-RS configuration consisting of a plurality of CSI-RS antenna port groups from which a beamformed CSI-RS is transmitted,
calculate CSI regarding a downlink channel based on the beamformed CSI-RS related to the received CSI-RS configuration, and
report the calculated CSI to the serving cell,
wherein the CSI-RS configuration includes information on a number of the CSI-RS antenna port groups and a number of antenna ports of each CSI-RS antenna port group.

9. The terminal according to claim 8, wherein the CSI-RS configuration includes a position of CSI-RS resource of each CSI-RS antenna port group.

10. The terminal according to claim 8, wherein the CSI-RS configuration includes a CSI-RS transmission period and offset of each CSI-RS antenna port group.

11. The terminal according to claim 8, wherein each CSI-RS antenna port group has N CSI-RS antenna port(s), where N is one selected from 1, 2, 4 or 8.

12. The terminal according to claim 8, wherein the calculated CSI includes a precoding matrix for selecting a CSI-RS antenna port group and a precoding matrix to be applied to the selected CSI-RS antenna port group.

13. The terminal according to claim 8, wherein the processor receives information regarding precoding rank restriction for selecting the CSI-RS antenna port group or information regarding precoding rank restriction to be applied to the selected CSI-RS antenna port group from the serving cell.

14. The terminal according to claim 8, wherein the CSI-RS configuration includes a ratio of physical downlink shared channel (PDSCH) energy per resource element (EPRE) to CSI-RS EPRE of each CSI-RS antenna port group.

* * * * *